United States Patent
Yi et al.

(10) Patent No.: US 8,351,376 B2
(45) Date of Patent: *Jan. 8, 2013

(54) METHOD FOR TRANSMITTING PACKET DATA IN COMMUNICATION SYSTEM

(75) Inventors: Seung-June Yi, Seoul (KR);
Woon-Young Yeo, Kyungki-Do (KR);
So-Young Lee, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 297 days.

This patent is subject to a terminal disclaimer.

(21) Appl. No.: 12/656,338

(22) Filed: Jan. 26, 2010

(65) Prior Publication Data

US 2010/0135216 A1 Jun. 3, 2010

Related U.S. Application Data

(60) Continuation of application No. 11/723,171, filed on Mar. 16, 2007, now Pat. No. 7,656,902, which is a division of application No. 10/303,059, filed on Nov. 25, 2002, now Pat. No. 7,486,699.

(30) Foreign Application Priority Data

Nov. 24, 2001 (KR) .................. 2001/73640
Nov. 24, 2001 (KR) .................. 2001/74774

(51) Int. Cl.
*H04W 4/00* (2009.01)
(52) U.S. Cl. .................................... 370/328
(58) Field of Classification Search ......... 370/203, 370/204–215, 229–240, 241–253, 310–337, 370/338–350, 395.1, 395.3, 395.4, 395.41, 370/395.42, 395.5, 395.52, 395.53, 412–421, 370/431–457, 458–463, 464–497, 498–522, 370/521–529
See application file for complete search history.

(56) References Cited

U.S. PATENT DOCUMENTS

| 6,032,197 | A | 2/2000 | Birdwell et al. |
| 6,385,199 | B2 | 5/2002 | Yoshimura et al. |
| 6,542,931 | B1 | 4/2003 | Le et al. |

(Continued)

FOREIGN PATENT DOCUMENTS

EP 1 137 237 9/2001

(Continued)

OTHER PUBLICATIONS

3GPP TS 25.323 v3.3.0 (Sep. 2000), "$3^{rd}$ Generation Partnership Project; Technical Specification Group Radio Access Network; Packet Data Convergence Protocol (PDCP) Specification (Release 1999)" pp. 1-17.

(Continued)

*Primary Examiner* — Kwang B Yao
*Assistant Examiner* — Jung-Jen Liu
(74) *Attorney, Agent, or Firm* — McKenna Long & Aldridge LLP

(57) ABSTRACT

A method and apparatus for a transmitter having a radio protocol with an upper layer and a lower layer therein used for management of full header packet transmission when transmitting data packets to a receiver are provided. If the upper layer receives from the lower layer, information of a successful transmission of a full header packet, the upper layer decides to stop sending any additional full header packet that contains the same full header as the previously successfully transmitted full header packet.

10 Claims, 13 Drawing Sheets

U.S. PATENT DOCUMENTS

| | | | |
|---|---|---|---|
| 6,608,841 B1 | 8/2003 | Koodli | |
| 6,618,397 B1 | 9/2003 | Huang | |
| 6,707,819 B1 | 3/2004 | Fraser et al. | |
| 6,711,164 B1 | 3/2004 | Le et al. | |
| 6,751,209 B1 | 6/2004 | Hamiti et al. | |
| 6,857,095 B2 | 2/2005 | Suumaki et al. | |
| 6,882,637 B1 | 4/2005 | Le et al. | |
| 6,967,964 B1 | 11/2005 | Svanbro et al. | |
| 7,006,472 B1 * | 2/2006 | Immonen et al. | 370/332 |
| 7,035,287 B2 * | 4/2006 | Tourunen et al. | 370/477 |
| 7,061,936 B2 | 6/2006 | Yoshimura et al. | |
| 7,136,377 B1 | 11/2006 | Tweedly et al. | |
| 7,136,395 B2 | 11/2006 | Lupien et al. | |
| 7,164,665 B2 * | 1/2007 | Tourunen | 370/329 |
| 7,266,105 B2 | 9/2007 | Wu | |
| 7,286,536 B2 * | 10/2007 | Greis et al. | 370/392 |
| 7,301,947 B2 * | 11/2007 | Tourunen et al. | 370/392 |
| 7,394,807 B2 * | 7/2008 | Hamiti et al. | 370/389 |
| 7,920,590 B2 * | 4/2011 | Le et al. | 370/467 |
| 2001/0007137 A1 | 7/2001 | Suumaki et al. | |
| 2001/0030963 A1 | 10/2001 | Yoshimura et al. | |
| 2001/0048680 A1 | 12/2001 | Yoshimura et al. | |
| 2001/0055298 A1 * | 12/2001 | Baker et al. | 370/349 |
| 2002/0044552 A1 | 4/2002 | Vialen et al. | |
| 2002/0064164 A1 | 5/2002 | Barany et al. | |
| 2002/0071432 A1 | 6/2002 | Soderberg et al. | |
| 2002/0097723 A1 * | 7/2002 | Tourunen et al. | 370/392 |
| 2003/0061557 A1 | 3/2003 | Chao et al. | |
| 2003/0130000 A1 | 7/2003 | Le et al. | |
| 2003/0137931 A1 | 7/2003 | Hans et al. | |
| 2004/0008650 A1 * | 1/2004 | Le et al. | 370/338 |
| 2004/0042491 A1 | 3/2004 | Sarkkinen et al. | |
| 2010/0135216 A1 * | 6/2010 | Yi et al. | 370/328 |

FOREIGN PATENT DOCUMENTS

| | | |
|---|---|---|
| EP | 1 146 713 A2 | 10/2001 |
| JP | 63-114438 | 5/1998 |
| JP | 63-248254 | 10/1998 |
| JP | 2001-320422 | 11/2001 |
| JP | 2002-026963 | 1/2002 |
| JP | 2002-537716 | 11/2002 |
| JP | 2003-523138 | 7/2003 |
| JP | 2003-529247 | 9/2003 |
| JP | 2003-529981 | 10/2003 |
| JP | 2003-530764 | 10/2003 |
| RU | 2 189 072 C2 | 6/2000 |
| WO | WO 94/30014 A1 | 12/1994 |
| WO | WO 00/49748 | 8/2000 |
| WO | WO 00/72486 A1 | 11/2000 |
| WO | WO 01/60017 A1 | 8/2001 |
| WO | WO 01/63876 A1 | 8/2001 |
| WO | WO 01/67709 A2 | 9/2001 |

OTHER PUBLICATIONS

Degermark, M.; "IP Header Compression"; Network Working Group, Lulea University of Technology/SICS; IETF Standards; Internet Engineering Task Force, Feb. 1999 (XP 015008290).

ETSI TS 125 323 v3.6.0 (Sep. 2001); Universal Mobile Telecommunications System (UMTS); Packet Data Convergence Protocol (PDCP) Specification (3GPP TS 25.323 v 3.6.0 Release 1999) (XP 014008762).

Degermark, M., et al.; "Low-Loss TCP/IP Header Compression for Wireless Networks"; ACM, US. vol. 3, No. 5, Oct. 1997, pp. 375-387 (XP 000728935).

European Search Report.

Russian Office Action dated Oct. 26, 2007.

Torkelsson, Kjell, et al.; "Header Compression in Handel-C—an Internet Application and a New Design Language"; Euromicro symposium on Digital Systems, Design, Proceedings 2001; pp. 2-7.

Hayden, M. et al.; Optimizing Layered Communications Protocols; The Sixth IEEE International Symposium on High Performance Distributed Computing, Proceedings, Aug. 5-8, 1997, pp. 169-177.

International Search Report dated Jan. 15, 2003.

European Search Report dated Aug. 6, 2008.

* cited by examiner

▮ FULL HEADER PACKET

▯ COMPRESSED HEADER PACKET

FIG. 10B

COMPRESSED_TCP FORMAT

| CID |  |
|---|---|
| R O I P S A W U |  |
| TCP CHECKSUM |  |
| RANDOM FIELDS, IF ANY |  |
| R-OCTET | (if R=1) |
| URGENT POINTER VALUE | (if U=1) |
| WINDOW DELTA | (if W=1) |
| ACKNOWLEDGMENT NUMBER DELTA | (if A=1) |
| SEQUENCE NUMBER DELTA | (if S=1) |
| IPv4 DENTIFICATION DELTA | (if I=1) |
| OPTIONS | (if O=1) |

FIG. 10C

COMPRESSED_TCP_NONDELTA FORMAT

| CID |
|---|
| RANDOM FIELDS, IF ANY |
| WHOLE TCP HEADER EXCEPT FOR PORT NUMBERS |

COMPRESSED_NON-TCP FORMAT,8BIT CID

| CID | | |
|---|---|---|
| 0 | D | GENERATION |
| DATA | | (if D=1) |
| RANDOM FIELD,IF ANY | | |

COMPRESSED_NON-TCP FORMAT,16BIT CID

| MSB OF CID | | |
|---|---|---|
| 1 | D | GENERATION |
| LSB OF CID | | |
| DATA | | (if D=1) |
| RANDOM FIELD,IF ANY | | |

METHOD FOR TRANSMITTING PACKET DATA IN COMMUNICATION SYSTEM

CROSS-REFERENCE TO RELATED APPLICATIONS

This is a Continuation Application of U.S. patent application Ser. No. 11/723,171, filed Mar. 16, 2007, now U.S. Pat. No. 7,656,902 which application a Divisional Application of prior U.S. patent application Ser. No. 10/303,059, filed Nov. 25, 2002, now U.S. Pat. No. 7,486,699, which claims priority under 35 U.S.C. §119 to Korean Application Nos. 73640/2001 and 74774/2001 both filed on Nov. 24, 2001, all of which are incorporated for all purposes by reference in its entirety herein.

BACKGROUND

1. Field of the Invention

The present invention generally relates to the transmission of packet data in a communications system, and more particularly to a system and method for sending packet data which includes header information.

2. Background of the Related Art

As mobile communications technology continues to evolve, wireless phone sets are expected to become more widely used than standard wired telephone sets. Wired sets, however, remain the terminal of choice for some applications. For example, radio mobile communications technology significantly lags behind the performance of existing wired communications systems when it comes to transmitting large amounts of data and voice traffic between terminals. Several wireless communications standards have been proposed to address this problem. One standard called IMT-2000 allows large amounts of data to be communicated between terminals and therefore has been promoted in many countries. In fact, international cooperation is currently underway for developing a single standard for this technology.

Recently, this cooperative effort has resulted in an initiative known as the third generation partnership project (3GPP). The 3GPP initiative has been established for the purpose of standardizing, among other things, a third-generation IMT-2000 system based on a communications platform adopted in Europe. The standard, known as the universal mobile telecommunications system (UMTS), has received contributions from a variety of national, international, and local standardization institutions such as TTA in Korea, CWTS in China, T1 in the U.S.A., and ARIB/TTC in Japan.

The UMTS adopts a wideband code division multiple access (WCDMA) technique as a radio access network technique, and is being developed to include a general packet radio service (GPRS) based on a packet-switching network and a global system for a mobile communication (GSM) based on a circuit switching network. UMTS is also being developed to provide multimedia services such as voice, image and data.

The 3GPP project includes five technical specification groups (TSG) each of which handles development, approval and management of the standard in a related field.

The radio access network (RAN) group (TSG-RAN) manages the development of functional requirements and a standard for an interface between wireless terminals and a UMTS terrestrial radio access network (UTRAN). The core network (CN) group (TSG-CN) manages the development of the functions of the core network, and the requirements and the standard of an interface which allows the UTRAN to access a circuit-switching backbone network or a packet-switching backbone network.

The full-header plays a critical role in the header compression technique of the related art packet-switching backbone network. If the full-header is not transmitted properly, every packet received thereafter cannot be decompressed and is discarded. In order to solve this problem when a non-TCP protocol such as UDP/IP is used, the related art system requires a transmitting party to transmit a full-header packet that can be used to construct a context to the receiving party multiple times within the same data stream according to certain regulations.

In the Compressed non-TCP compression technique, that is, the header compression technique used for the UDP/IP protocol, a full-header packet is transmitted at least once in each exponentially increasing period, which is called compression slow-start (CSS). According to the CSS method, if the full-header information is changed or a fresh header compression technique is applied, the transmission interval for the same full-header is shortened at an initial stage and then gradually increased thereafter.

FIG. 1 is a diagram showing a transmission intervals for transmitting full-header information in accordance with the CSS method. As shown, the transmission intervals for the full-header packet increase exponentially, and the number of compressed header packets transmitted between neighboring full-header packets (i.e., within each interval) is increased by 1, 2, 4, 8, . . . . The transmission interval is not infinitely increased but maintained at the same interval when it reaches a transmission interval threshold value, which is usually set by 256. For reference, the full-headers transmitted by the CSS method have the same CID (context identifier) value and generation number. That is, the full-header packet is transmitted in an exponential period for a packet stream with the same CID and generation value.

As previously discussed, if a header compression technique is used, the header size of the packet can be considerably reduced. Especially, in the case where a normal packet is transmitted through a radio interface, since the header of the packet is too big to be neglected compared with the payload size (a data portion of the packet), the header needs to be compressed.

FIG. 2 is a block diagram of a packet transmission system of the related art which uses a header compression technique. The system includes a header compression unit 10, provided in the PDCP layer, which compresses a header of data received from an upper layer under control of a header compression control unit 12. The full-header packet or the compressed header packet converted by the header compression unit 10 is delivered to the RLC layer through a data transmission unit 14. A buffer and transmission unit 16 of the RLC layer stores the full-header packet or the compressed header packet received from the data transmission unit 14 of the PDCP and/or transmits it to a receiving party.

Operation of the system will now be explained. First, in a case of using Compressed TCP as the header compression technique, a transmitting party first transmits a full-header packet for a packet stream to construct a context at a receiving party. One or more compressed headers are then transmitted indicating differences between successive packets.

If the full-header packet is not successfully transmitted from the transmitting party, since the context is not properly constructed at the receiving party, the receiving party fails to restore subsequently received compressed headers. In addition, even in the case where a compressed header packet is successfully transmitted, since the context of the receiving party is not properly updated, the following compressed headers cannot be restored, just as in the case where the full-header packet is lost. Since the damaged context can be recovered only by receiving a new full-header of a corresponding context, the receiving party transmits a context-state packet requesting transmission of a new full-header of the corresponding context from the transmitting party.

FIG. 3 shows a structure of a context-state packet in accordance with the related art. This packet includes a plurality of CID fields, each of which signifies one damaged context, that is, one damaged packet stream. Such a context-state packet is not used whenever one context is damaged, but is transmitted to the transmitting party when more than a predetermined number of contexts are damaged. In addition, transmission of the context-state packet itself from the receiving party to the transmitting party wastes radio resources, so that its frequency of use is limited in RFC 2507.

In transmitting packet data using the Compressed TCP header compression technique, if a full-header packet or a compressed header packet is lost, it takes a large amount of time to restore a corresponding context by the receiving party. Moreover, the transmitting party is not aware that the corresponding context has been damaged. Thus, the following compressed header packets are uselessly transmitted, which results in wasting radio resources.

FIG. 4 shows a structure of a compressed header used in a UDP/IP protocol. As previously discussed, in performing UDP/IP header compression, the generation value of corresponding header information as well as the CID value is used to discriminate packet streams. Thus, the compressed header only contains the CID field, the generation field, and the checksum field and as a result has a total length of about 4-5 octets.

In the compressed header of FIG. 4, if an 8 bit CID is used, CID(2) positioned at the third octet is not necessary. If a 16 bit CID is used, 8 bits are allocated to CID(1) and the other 8 bits are allocated to CID(2). Considering that the size of a full-header is 48 octets, it is noted that the same purpose can be achieved by transmitting a very small amount.

In transmitting packet data using the Compressed TCP header compression technique following the TCP/IP Header Compression Algorithm (RFC 2507 Compressed TCP), a full-header packet is transmitted at the first packet of a packet stream. The following packets are transmitted with compressed header containing the variance from previously transmitted headers of a packet stream. The context of the packet stream is continuously updated with the compressed header in the reference of previously received packet headers.

In transmitting packet data using another Compressed TCP header compression technique following the TCP/IP Header Compression Algorithm (RFC 2507 Compressed TCP non-delta), a full-header packet is transmitted at the first packet of a packet stream. The following packets are transmitted with compressed header containing the variance from previously transmitted full header of the packet stream. The context of the packet stream is continuously updated with the compressed header in the reference of previously received full header.

In transmitting packet data using UDP/IP Header Compression Algorithm (Compressed non-TCP, Compression Slow-Start, hereinafter referred to CSS), full-header packets are transmitted at the first packet and some of following packets of a packet stream in a predetermined rule. FIG. 5 is a flow chart of a related art method for transmitting a full-header packet and a compressed header packet according to the CSS method. In this figure, an INT (Interval) value indicates the number of compressed header packets that can be transmitted between two consecutively transmitted full-header packets, and a CNT (Count) value indicates the number of transmitted compressed header packets.

According to this method, a compressed header packet is transmitted, and when the CNT value and the INT value become the same, the full-header packet is transmitted instead of the compressed header packet. The INT value is updated at the time when the full-header is to be transmitted. When the INT value reaches a MaxINT, which corresponds to a transmission interval threshold value, the INT value is no longer increased and the MaxINT is maintained. The process is terminated when all data in a packet stream are transmitted or when the full-header information is changed. The transmission method will now be described in greater detail.

First, the minimum number (INT) of compressed header packets that can be transmitted between the full-header packets is set to an initial value of '1'.

When a header packet transmission operation is initiated, the full-header packet is first transmitted (S80), and then the CNT indicating the number of the transmitted compressed header packets is initialized to a value of '0' (CNT=0) (S81). Next, the compressed header packet is transmitted (S82) and then the CNT indicating the number of transmitted compressed header packets is increased by '1' (CNT=CNT+1) (S83).

Next, the INT value and the CNT value are compared (S84), and if the two values are different a compressed header packet is additionally transmitted and steps S82-S84 are repeatedly performed. If the two values are the same, it is checked whether the INT value is greater than the MaxINT (in the present invention, MaxINT=256) (S85). If the INT value is smaller than the MaxINT, steps S80-S85 are repeatedly performed while increasing the INT value by the unit of multiple of '2' (1, 2, 4, 8, 16, . . . , 256). If, however, the INT value is the same or greater than the MaxINT value, the INT value is no longer increased and the same transmission interval is maintained.

Transmitting full-header packets using the CSS method of the related art is advantageous in at least two respects. First, even if the full-header packet is lost during transmission, the compressed header can be recovered by using the next-transmitted full-header packet. Second, in the case where the same packet is broadcast to several users through a multicast technique, even if a new user is connected in the course of broadcasting, the new user can receive data normally after receiving the full-header packet (e.g., the new user can receive compressed packets and then recover them based on information in a next-transmitted full-header packet). These advantages lend a measure of stability to the system.

In spite of these advantages, the CSS method of the related art has a number of drawbacks. For example, since the full-header is much larger than the compressed header, repeated transmission of a considerable number of full-header packets within a same data stream substantially degrades transmission efficiency. This is especially true if the full-header packet is successfully transmitted at the initial stage. Under these circumstances, the related art method will continue to intermittently transmit full-header packets in the data system even though the initial full-header packet was successfully transmitted. As will become more apparent below, the Inventors of the present invention have determined that every full-header packet transmitted after an initial full-header packet has been successfully received may be considered to be an unnecessarily transmitted one.

The Compressed TCP header compression technique following the TCP/IP Header Compression Algorithm of the related art also has a number of drawbacks. For example, the context of a packet of compressed header is recovered in the reference of the full-header directly or indirectly. If, one of the headers of a packet in a stream is not received successfully or the full-header is not received successfully, several packets following that packet could not be recovered for a time being. That is, the transmission of packet data using the Compressed TCP header compression technique, if a full-header packet or a compressed header packet is lost, it takes a large amount of time to restore a corresponding context by the receiving party. Moreover, the transmitting party is not aware that the corresponding context has been damaged. Thus, the following compressed header packets are uselessly transmitted, which results in wasting radio resources. If the receiver transmits the request of sending a full-header packet to the transmitter immediately, the traffic load for the request might be a burden to the radio channel.

SUMMARY OF THE INVENTION

An object of the invention is to solve at least the above problems and/or disadvantages and to provide at least the advantages described hereinafter.

It is another object of the present invention to achieve the aforementioned object by providing a system and method which controls the transmission of packets in a communications system in a manner which is faster and more efficient than other systems/methods which have been proposed.

It is another object of the present invention is to achieve the aforementioned object by substantially increasing the efficiency of recovering the context of the header information and the packets transmitted in the system while at the same time decreasing the request of sending a full-header packet to the transmitter in any given data stream compared with other proposed systems.

It is another object of the present invention to achieve the aforementioned object using an improved header compression scheme which optimizes the transmission of full-header packets and minimizes the number of request of sending a full-header packet in any given data stream, thereby improving transmission efficiency compared with other proposed systems.

It is another object of the present invention is to achieve the aforementioned object by substantially decreasing the number full-header packets transmitted in the system while at the same time increasing the number of compressed header packets in any given data stream compared with other proposed systems.

It is another object of the present invention to achieve the aforementioned object using an improved header compression scheme which minimizes the number of full-header packets and maximizes the number of compressed header packets transmitted in any given data stream, thereby improving transmission efficiency compared with other proposed systems.

It is another object of the present invention is to provide a packet data transmitting system method which improves a transmission efficiency and decompression efficiency of a packet when a Compressed TCP compression technique is used in a UMTS system.

It is another object of the present invention is to provide a packet data transmitting method in which, when a full-header packet of a specific packet stream is repeatedly transmitted periodically or non-periodically, transmission of the full-header packet is controlled to thereby increase a transmission efficiency.

To achieve these and other objects and advantages, there is provided a packet data transmitting method of a communication system in which, with respect to one packet stream, a header compression layer of a transmitting party determines the transmission of a full-header packet with a full-header or a compressed header packet with a compressed header through a data link layer in the reference of the transmission status of the previous data packet in the data link layer.

In the packet data transmitting method of the present invention, preferably, in the header compression layer of a communication system transmitting party including the steps of receiving a packet data stream from upper layer; transmitting a full-header packet having full-header information of the packet data stream through a lower layer; transmitting a compressed header packet having a compressed header holding a portion of the full-header information through the lower layer; detecting the packet has been received by the receiving party with the report of the lower layer; and transmitting a packet to be transmitted as a full-header packet if it is detected that the packet has not been received.

In the packet data transmitting method of the present invention, preferably, in the detecting step includes steps of: detecting whether a data link layer detects a packet transmission failure; and receiving the detected transmission failure information from the data link layer.

In the packet data transmitting method of the present invention, preferably, the transmission failure information contains ID information and/or transmission failure indicating information of the corresponding packet.

In the packet data transmitting method of the present invention, preferably, the predetermined compression method is that a context is updated by the header of present packet in the reference of the previous packet header successively updated from the full-header.

In the packet data transmitting method of the present invention, preferably, the compression method updated with the header of present packet in the reference of the previous packet header successively updated from the full-header is a Compressed TCP technique.

In the packet data transmitting method of the present invention, preferably, the predetermined compression method is that a context is updated by the header of present packet in the reference of the previous full-header.

In the packet data transmitting method of the present invention, preferably, the compression method that a context is updated with the full-header packet is a Compressed TCP nondelta technique.

In the packet data transmitting method of the present invention, preferably, the header compression layer is a packet data convergence protocol (PDCP) layer and the data link layer is a radio link control (RLC) layer.

In the packet data transmitting method of the present invention, preferably, an upper layer at the control plane of the RLC layer is an RRC layer which manages a radio resource, and the RRC layer sets a radio bearer such that information of an SDU discarded from the RLC is provided to the PDCP layer.

In the packet data transmitting method of the present invention, preferably, when the PDCP layer delivers a PDCP PDU to the RLC layer, the PDCP layer instructs the RLC layer to inform the PDCP layer about a transmission failure result on the corresponding PDU.

In the packet data transmitting method of the present invention, preferably, when the PDCP layer delivers the PDCP PDU to the RLC layer, the PDCP layer transmits a transmission failure report indicator together with the corresponding PDU.

To achieve these and other objects and advantages, there is provided a packet data transmitting method of a communication system in which, with respect to one packet stream, a header compression layer of a transmitting party transmits a full-header packet with a full-header or a compressed header packet with a compressed header through a data link layer and a header compression layer of a receiving party recovers compressed header information of the compressed header packet by using full-header information of the full-header packet, including the steps of: receiving a packet data stream using an Internet protocol; transmitting a full-header packet having full-header information of the packet data stream; transmitting a compressed header packet having a compressed header holding a portion of the full-header information; detecting whether the packet has been received by the receiving party; and transmitting a packet to be transmitted the very next as a full-header packet if it is detected that the packet has not been received.

In the packet data transmitting method of the present invention, preferably, the detecting step includes steps of detecting whether a data link layer detects a packet transmission failure; and delivering the detected transmission failure information to the header compression layer.

In the packet data transmitting method of the present invention, preferably, the transmission failure information contains ID information and/or transmission failure indicating information of the corresponding packet.

In the packet data transmitting method of the present invention, preferably, the predetermined compression method is that a context is updated by the header of present packet in the reference of the previous packet header successively updated from the full-header.

In the packet data transmitting method of the present invention, preferably, the compression method updated with the header of present packet in the reference of the previous packet header successively updated from the full-header is a Compressed TCP technique.

In the packet data transmitting method of the present invention, preferably, the predetermined compression method is that a context is updated by the header of present packet in the reference of the previous full-header.

In the packet data transmitting method of the present invention, preferably, the compression method that a context is updated with the full-header packet is a Compressed TCP nondelta technique.

The packet data transmitting method of the present invention, preferably, further includes a step of delivering a fresh full-header packet to the transmitting party of the data link layer if the transmission failure information is received from the data link layer.

In the packet data transmitting method of the present invention, preferably, when the header compression layer receives the transmission failure information, the header compression layer compresses a following first packet using the same CID with the transmission-failed packet to a full-header packet and transmits it.

In the packet data transmitting method of the present invention, preferably, the header compression layer is a packet data convergence protocol (PDCP) layer and the data link layer is a radio link control (RLC) layer.

In the packet data transmitting method of the present invention, preferably, an upper layer at the control plane of the RLC layer is an RRC layer which manages a radio resource, and the RRC layer sets a radio bearer such that information of an SDU discarded from the RLC is provided to the PDCP layer.

In the packet data transmitting method of the present invention, preferably, when the PDCP layer delivers a PDCP PDU to the RLC layer, the PDCP layer instructs the RLC layer to inform the PDCP layer about a transmission failure result on the corresponding PDU.

In the packet data transmitting method of the present invention, preferably, when the PDCP layer delivers the PDCP PDU to the RLC layer, the PDCP layer transmits a transmission failure report indicator together with the corresponding PDU.

The present invention also provides a packet data transmitting method in a header compression layer that transmits a full-header packet or a compressed header packet through a data link layer with respect to one packet stream so that a receiving party can restore compressed header information of the compressed header packet by using full-header information of the full-header packet; including the steps of delivering the full-header packet or the compressed header packet to the data link layer; detecting a transmission result of a packet by the data link layer; and sending a following packet as a full-header packet and transmitting it when transmission failure information is delivered from the data link layer over more than one packet.

The present invention also provides a packet data transmitting apparatus which includes a header compression unit provided in a header compression layer and compressing a header of a data received from an upper layer to transform it to a full-header packet or to a compressed header packet; a header compression control unit for controlling header compression of the header compression unit according to transmission failure information; a data transmission unit for delivering the transformed full-header packet or the compressed header packet to a data link layer; a buffer and transmission unit provided in the data link layer and transmitting a packet transmitted from the data transmission unit of the header compression layer to a receiving party; and a transmission failure discriminating unit for discriminating a transmission failed-packet of packets transmitted to the receiving party and delivering transmission failure information to the header compression control unit.

In the packet data transmitting apparatus of the present invention, preferably, the transmission failure information contains ID information of a corresponding packet or/and a transmission failure indicator.

In the packet data transmitting apparatus of the present invention, preferably, the header compression control unit controls the header compression unit to compress a following first packet using the same CID as a CID of the transmission-failed packet as a full-header packet if it receives transmission failure information from the transmission failure discriminating unit.

In the packet data transmitting apparatus of the present invention, preferably, the header compression layer is a packet data convergence protocol (PDCP) layer and the data link layer is a radio link control (RLC) layer.

The present invention also provides, a packet data transmitting method of a communication system in which, with respect to one packet stream, a header compression layer of a transmitting party determines the transmission of a full-header packet with a full-header or a compressed header packet with a compressed header through a data link layer in the reference of the transmission success of the previous full-header packet in the data link layer.

In the packet data transmitting method of the present invention, preferably, in the header compression layer of a communication system transmitting party including the steps of receiving a packet data stream from upper layer; transmitting a full-header packet having full-header information of the packet data stream through a lower layer; transmitting a compressed header packet having a compressed header holding a portion of the full-header information through the lower layer; detecting the packet has been received by the receiving party with the report of the lower layer; and transmitting a packet to be transmitted as a compressed-header packet if it is detected that the packet has been received.

In the packet data transmitting method of the present invention, preferably, a transmitting party transmits a full-header packet or a compressed header packet and a receiving party recovers compressed header information of the compressed header packet by using full-header information of the full-header packet, including the steps of: receiving a packet data stream using an Internet protocol; transmitting a full-header packet having full-header information of the packet data stream; detecting whether the receiving party has received the packet; and transmitting packets in the same stream which is transmitted next as compressed header packets when it is detected that the packet has been received.

In the packet data transmitting method of the present invention, preferably, if at least one full-header packet of the transmitted full-header packets is successfully transmitted, the header compression layer does not transmit the full-header packet any more and transmits only the compressed header packet.

In the packet data transmitting method of the present invention, preferably, the full-header packet is transmitted by using a compression slow start technique.

In the packet data transmitting method of the present invention, preferably, the header compression handling layer receives information on a failure of transmitting of the full-header packet over a specific packet stream from a data link layer, and if no full-header packet has been successfully transmitted previously, the header compression handling layer immediately transmits additionally a full-header packet for a corresponding packet stream regardless of a transmission period of the full-header packet.

In the packet data transmitting method of the present invention, preferably, the full-header packet is transmitted in a pre-set transmission period of the full-header packet after the additional transmission of the full-header packet.

In the packet data transmitting method of the present invention, preferably, the transmission result is packet ID information and transmission result information.

In the packet data transmitting method of the present invention, preferably, when the header compression layer delivers the full-header packet to the data link layer, a lower layer, it transmits the full-header packet and a full-header packet indicator indicating the full-header packet together.

In the packet data transmitting method of the present invention, preferably, when the header compression layer receives information that the full-header packet has been successfully transmitted from the data link layer, the header compression layer does not perform a periodically or non-periodically repeated transmission of the full-header packet with respect to the corresponding packet stream but transmits only the compressed header packet.

The present invention also provides a packet data transmitting method of a communication system in which a header compression layer repeatedly transmits a full-header packet over a specific bit stream to a receiving party through a data link layer periodically or non-periodically, including the steps of: transmitting a full-header packet or a compressed header packet; detecting a transmission result of the compressed header packet; and transmitting only a compressed header, not the full-header packet, when at least one full-header packet is successfully transmitted with respect to one packet stream.

In the packet data transmitting method of the present invention, preferably, the full-header packet is transmitted by using a compression slow start technique.

Preferably, the packet data transmitting method of the present invention further includes a step of additionally transmitting a full-header packet with respect to a corresponding packet stream regardless of a transmission period of the full-header packet if transmission of a full-header packet with respect to a specific packet stream is failed and no full-header packet has been successfully transmitted previously.

In the packet data transmitting method of the present invention, preferably, the transmission result is ID information of a packet and transmission result information.

BRIEF DESCRIPTION OF THE DRAWINGS

The invention will be described in detail with reference to the following drawings in which like reference numerals refer to like elements wherein:

FIGS. 10B and 10C illustrate the compressed TCP format and compressed TCP nondelta format, respectively;

DETAILED DESCRIPTION OF PREFERRED EMBODIMENTS

Figure 6:
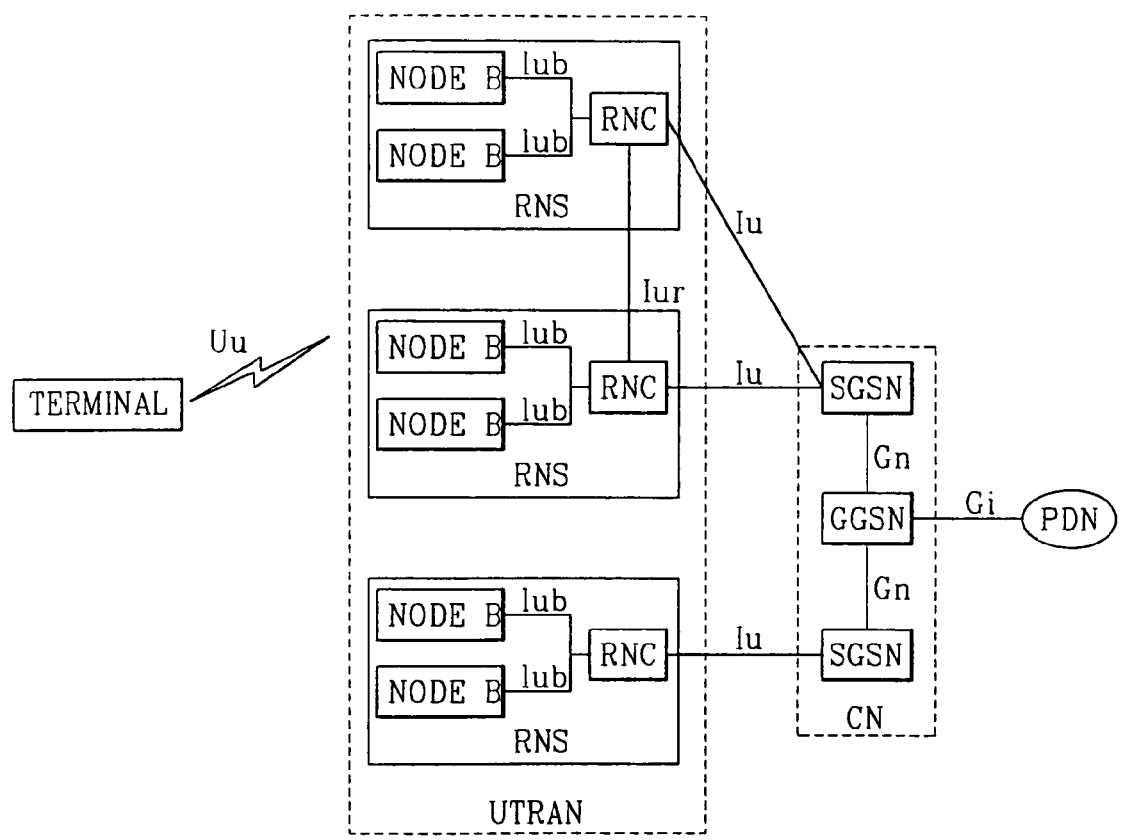
FIG. 6 is a drawing illustrating a network structure in a packet domain among network structures recommended by 3GPP.

FIG. 6 is a drawing showing a network structure of a packet-switching domain proposed by the TSG-RAN and the TSG-CN. In this structure, the UTRAN includes a plurality of radio network subsystems (RNSs), each of which includes a plurality of nodes B connected to one radio network controller (RNC).

The core network (CN) has a different structure according to an adopted switching mode (the packet-switching network or the circuit-switching network). In the case where a packet-switching network is taken into account in the present invention, the CN preferably includes a plurality of Serving GPRS support nodes (SGSNs) and one gateway GPRS support node (GGSN).

Each node B serves as a connection point for establishing a connection between user equipment (UE) (generally called a mobile station or a terminal) and the UTRAN. The RNC assigns a radio resource to each UE and manages the radio resource.

The RNC is classified into one of two types. One type of RNC, known as a control RNC (CRNC), manages a common radio resource. A second type of RNC, known as a serving RNC (SRNC), manages a dedicated radio resource allocated to each terminal. An RNC where the SRNC of the UE is positioned is called an SRNC, when viewed from a specific UE.

The SGSNs route information transmitted from the UTRAN to the CN, and the GGSN serves as a gateway to pass information from the UTRAN to different CNs, if a destination of the information is a network different from the current CN.

Data interfaces of each part have different names as follows. An interface between the UE and the nodes B is called 'Uu', an interface between the nodes B and an associated RNC is called 'Iub', an interface between the RNCs is called 'Iur', an interface between the RNCs and the SGSNs is called 'Iu', and an interface between the SGSNs and the GGSN or between the SGSNs is called 'Gn'.

The packet domain network (PDN) is a backbone network of a packet-switching domain which supports connection between different networks in a packet service area. FIG. 6 shows an example of a network structure, in which the interface 'Iur' may optionally exist between RNCs of a different SGSN. Also, the interface 'Gn' may optionally exist between the SGSNs.

Figure 7:
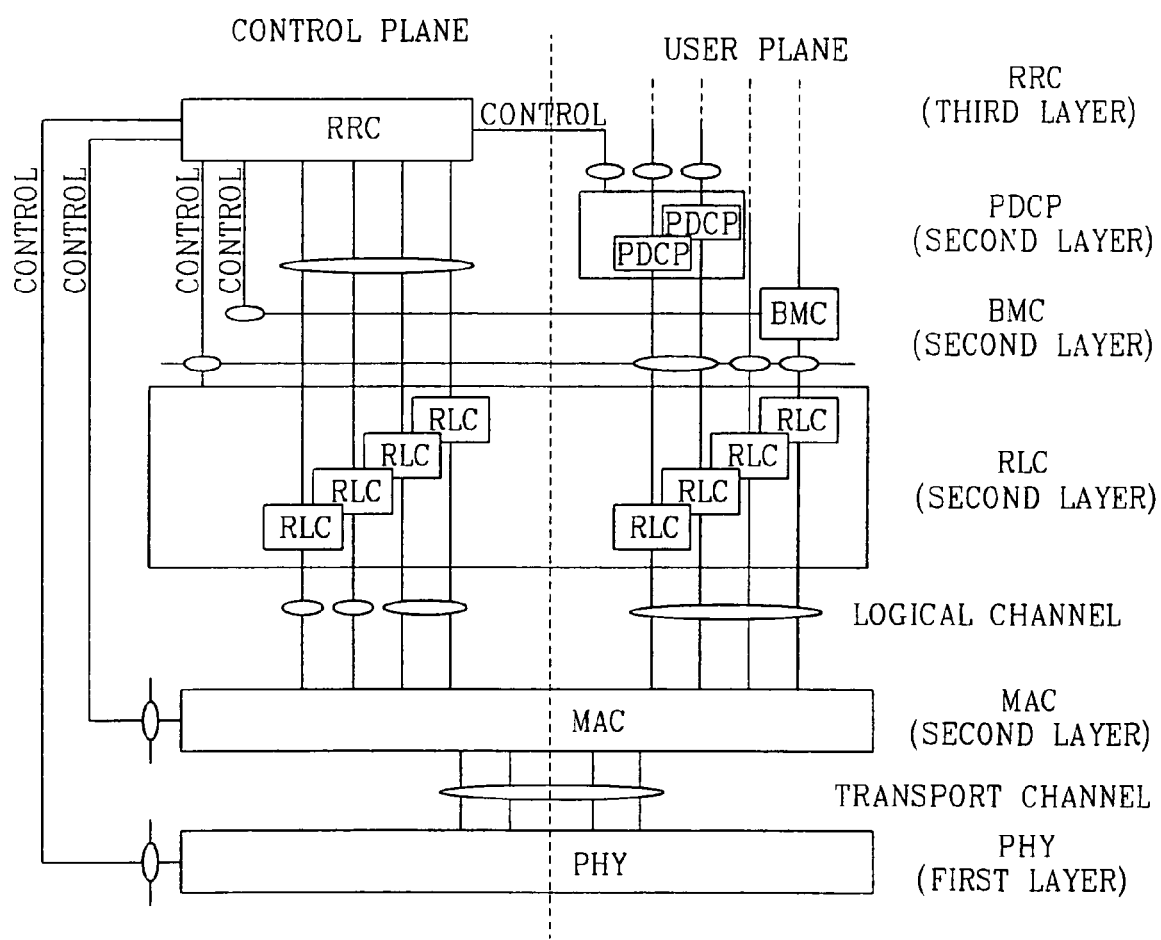
FIG. 7 is a drawing illustrating a radio interface protocol structure between a terminal and a UTRAN on the basis of a 3GPP radio access network standard.
Figure 8:
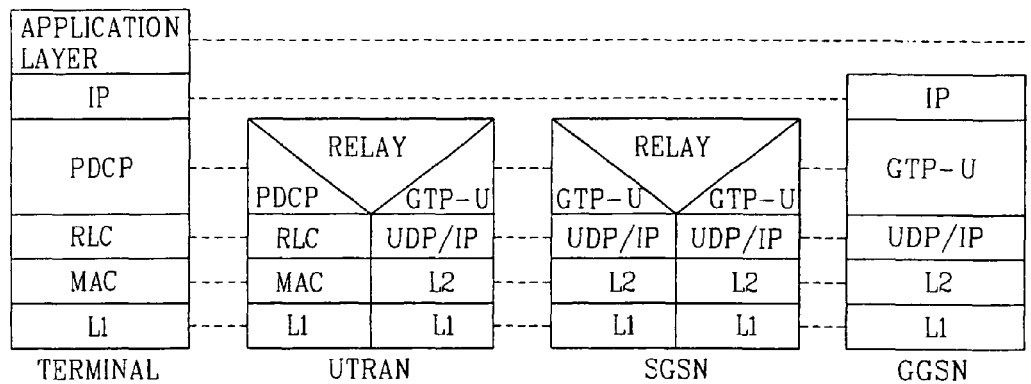
FIG. 8 is a drawing illustrating a protocol structure of a user plane usable when a UMTS network provides a packet switching service.

FIGS. 7 and 8 show that the network structure of FIG. 6 has a hierarchical structure. In FIG. 7, a detailed hierarchy of the UTRAN or the UE is shown for supporting an interface 'Uu', which is a radio interface. In this figure, the user plane (U-plane) is a region to which traffic information of a user such as a voice or IP packet is transmitted, and the control plane (C-plane) is a region to which control information such as maintenance and management of an interface or call is transmitted.

The U-plane includes a physical layer (L1) serving as a first layer, a packet data convergence protocol (PDCP) layer, a radio link control (RLC) layer, a medium access control (MAC) layer, and a broadcast/multicast (BMC) layer serving as a second layer (data link layer) of the 7 layers defined by OSI (Open Systems Interconnection) model.

The C-plane includes a radio resource control (RRC) layer, an RLC layer, a MAC layer, and an L1 layer.

The L1 layer (the physical layer) provides an information transmission service to an upper layer using diverse radio access techniques. The L1 layer is connected to the MAC layer through a transport channel, and data between the MAC layer and the L1 layer is exchanged through the transport channel. The transport channel is classified into one of two types, namely a dedicated transport channel and a common transport channel, depending on whether one dedicated terminal is used for the channel or the channel is shared by a plurality of terminals.

The MAC layer provides a MAC parameter re-allocation service for allocating and re-allocating the radio resource. The MAC layer is connected to the RLC layer through a logical channel, and diverse logical channels are provided according to types of transmitted information. In general, when information is transmitted on the C-plane a control channel is used, and when information is transmitted on the U-plane, a traffic channel is used.

The RLC layer performs the functions of setting up or releasing a radio link, segmenting and re-assembling the RLC service data units (SDU) coming down from an upper layer, and handling re-transmission of RLC PDUs lost during transmission.

The size of RLC SDUs is controlled in the RLC layer. Then, headers are attached in order to transform the SDUs into protocol data units (PDUs) for transmission to the MAC layer. The RLC layer operates in three modes, namely a transparent mode, an unacknowledged mode, and an acknowledged mode, according to a processing method of the RLC SDU. An RLC buffer is included in the RLC layer to store the RLC SDU or the RLC PDU.

The PDCP layer is an upper layer of the RLC layer which allows data transmitted through an IP network protocol, such as an IPv4 or an IPv6, to be effectively transmitted in the RLC layer. The PDCP layer also reduces header information which is unnecessary for a wireless network but which may be used for a wired network, thereby ensuring that the data can be effectively transmitted. This function, called header compression, may be used to reduce an amount of header information used, for example, in TCP/IP communications. For illustrative purposes, the PDCP layer and the BMC layer are shown positioned on the user plane since they only transmit user data.

The RLC layer may belong to the user plane or the control plane according to a layer connected to an upper side thereof. That is, when the RLC layer receives data from the RRC layer, it belongs to the control plane, while in other cases the RLC layer belongs to the user plane. In general, the transmission service of user data provided from the user plane to the upper layer by the L2 layer is defined as a radio bearer (RB), and a transmission service of control information provided from the control plane to the upper layer by the L2 layer is defined as a signaling radio bearer (SRB).

As further shown in FIG. 7, the RLC layer and PDCP layer may each include a plurality of entities. This is because one UE may have several RBs and, in general, one RLC entity and one PDCP entity are used for one RB. The entities of the RLC layer and the PDCP layer can perform independent functions in each layer.

The BMC layer transmits a message from a cell broadcast center (CBC) through a radio interface. A main function of the BMC is to schedule a cell broadcast message transmitted to the UE and to transmit it through an RLC layer operating in an unacknowledged mode.

The RRC layer, positioned at the lowermost of the third layer (L3), is defined only in the control plane. It functions to broadcast system information to every UE positioned in an arbitrary area.

The RRC layer also processes a control plane signal for a control signal exchanged in the third layer, and performs a function of setting up, maintaining and releasing a radio resource between the UE and UTRAN. In performing this latter function, the RRC layer sets up, re-constructs, and releases an RB and performs a function of allocating, re-arranging, and releasing a radio resource required for establishing a radio resource connection. At this time, setting up an RB includes a process of determining a protocol layer and channel characteristics required for providing a predetermined service in a radio area, as well as setting up each specific parameter and an operation method.

Services provided to the UE may generally be classified into circuit-switching services and packet-switching services. A voice call service is included, for example, in the circuit-switching service and a Web-browsing service through an Internet connection may be included in a packet-switching service. The circuit-switching service is connected to the UTRAN through the MSC of the core network, and the packet-switching service is provided through the SGSN of the core network. Thus, an access point with the core network to which the UTRAN is connected differs depending on the type of service provided.

FIG. 8 is a diagram showing an example of a protocol structure of the user plane which may be used to provide a packet-switching service in the UMTS network. Here, the SGSN supports the packet-switching service directed to the UTRAN and handles mobility management functions such as routing-area updating, position-information registration or calling, and security-related controlling. The GGSN supports a connection to a different packet-switching network such as an Internet network. A process of transmitting a packet-switching service from an external packet-switching network to a terminal will now be described.

After passing a diverse processing procedure, packets related to an application program reach the GGSN in the form of IP packets. Upon confirming addresses of the IP packet, the GGSN transmits the packets to the UTRAN through the SGSN.

At this time, a GTP-U used for transmission of the IP packet capsulizes the user data between the UTRAN and the SGSN or between the SGSN and the GGSN and tunnels it. That is, the GTP-U receives a user data packet from the external packet network, detects a destination address of the packet, and transmits it to the next destination according to a set path.

A user datagram protocol (UDP)/IP protocol widely used for packet transmission in a wired network is positioned in the lower layer of the GTP-U protocol and carries the GTP-U packet.

The IP packet transmitted up to the RNC of the UTRAN by the GTP-U is transmitted to the PDCP layer, which reduces a size of a header by a header compression technique and delivers the result to the RLC layer in the form of PDCP PDU (=RLC SDU).

The RLC layer suitably segments or concatenates the RLC SDUs coming down from the upper layer and fits them into the form of an RLC PDU, thereby constructing the RLC PDU. If the RLC SDU is larger than the RLC PDU, the RLC SDU can be segmented to construct several RLC PDUs. On the other hand, if the RLC SDU is smaller than the RLC PDU, several RLC SDU can be grouped together to construct one RLC PDU. The thusly constructed RLC PDUs are multiplexed with the RLC PDUs of other UEs in the MAC layer and transmitted to the physical layer.

In the UE (or terminal), the PDCP PDU is delivered through the MAC and RLC layers to the PDCP layer, and the PDCP layer of the UE restores the compressed header information to recover an original IP header. The resulting IP packet is then delivered to the IP layer.

The header compression technique that the PDCP layer performs at the UE and UTRAN will now be described. In transmitting an IP packet and especially in transmitting an IP packet through the radio interface, the reason why the header should be compressed is because the header size of the IP packet is not so small as to be neglected compared to the payload size of the packet.

For example, when the UE receives data from the IP network, header information of an IP is added to each packet to allow the packet to be routed in the IP network. At this time, in the case of IPv4, 24 octet header information is attached, and in the case of IPv6, 40 octet header information is attached. If the TCP layer or the UDP layer is positioned above the IP layer, 24 octet and 8 octet header information are additionally required. Thus, in case of transmitting a packet using TCP/IPv6, at least 64 octet header information is required per packet, while in case of transmitting a packet using the UDP/IPv6, at least 48 octet header information is required per packet. It is noted that in the case of a VoIP (Voice Over IP) service where a packet is transmitted using UDP/IPv6, 48 octet header information is substantially larger compared to the payload which has only scores of octets (e.g., 20 octet in the case where the header information is compressed by an 8 kbps G.729 codec).

Thus, if an IP packet is transmitted as is in a case where it is used for a link with a limited transmission bandwidth such as a radio link, it is easily anticipated that considerable performance degradation would occur. To avoid such a problem, research on header compression techniques has been conducted for reducing header information in packets.

Header compression techniques perform compression based on the realization that packets belonging to the same packet stream have almost the same header information. In other words, a packet stream signifies continuous packets having similar header information and, in general, packets used to provide a specific service may be considered as belonging to the same packet stream. For example, in the case of transmitting packets for TCP/IP, packets transmitted with the same address and port number are considered to belong to the same packet stream.

Figure 9:
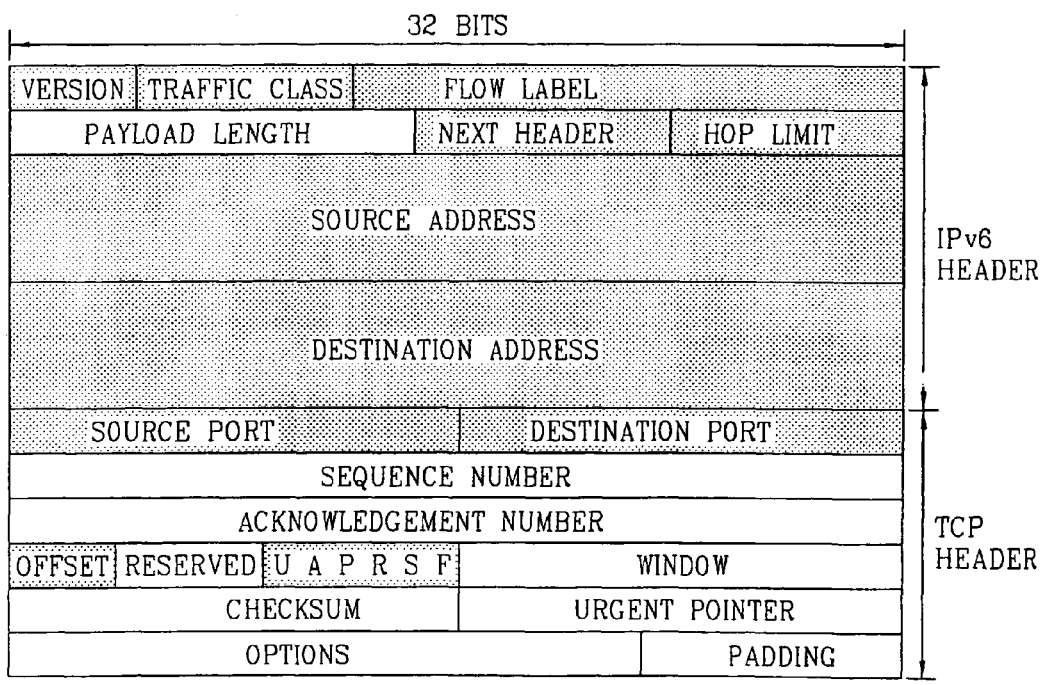
FIG. 9 is a drawing illustrating a structure of a normal header transmitted for a TCP/IPv6.

FIG. 9 shows a TCP/IPv6 header field provided to understand the principle and compression rate of a header compression technique. Initially, it is noted that as described above with respect to the discussion of packet stream, since address fields of the IPv6 and port numbers of the TCP header belong to the same packet stream, they may be considered to be constant. In FIG. 9, a version field indicates use of an Ipv6 header and the next header (NH) field indicates that header information coming after the IPv6 header is a TCP header. As a result, the two can be considered the same with respect to the corresponding packet stream.

A traffic class field indicates a priority of the corresponding packet, and a flow label (FL) field controls a packet according to the priority. At this time, if the FL value is set to a value other than '0', the traffic class field ahead of the FL field will not change. On the other hand, if the FL value is set to '0', the traffic class field value may be changed. However, since packets having a value of a different traffic class field may be defined as belonging to a different packet stream, values of the traffic class field and the FL field are considered unchanged with respect to one packet stream.

A hop limit (HL) field is reduced by '1' whenever a router is passed in a network. If the HL field value becomes '0', a corresponding packet is discarded. In general, since packets are transmitted through the same path in a network, the HL field value is also considered almost constant for a specific packet stream.

An offset field indicates a start point of the TCP data, which is constant.

In a case where packets belonging to the same packet stream are transmitted, the header fields containing information which is not changed mostly correspond to the fields of FIG. 9 which are shaded. Moreover, it is noted that detailed descriptions on header compression techniques are disclosed in formal technique documents related to the Internet technology presented by an IETF (Internet Engineering Task Force). For example, the PDCP layer may use an RFC 2507 and RFC 3095-based header compression technique. As for the RFC 2507 header compression technique, a different compression technique can be used depending on whether a protocol positioned above the IP layer is TCP or Non-TCP. If the protocol above the IP layer does not use TCP such as the UDP/IP protocol, a 'compression Non-TCP' method may be used. If the protocol above the IP layer is TCP, it is divided into a 'compressed TCP' and a 'compressed TCP nondelta' according to the way the variable header field is transmitted. The compressed TCP technique is a method of transmitting a difference value between consecutive packets, rather than sending an overall field value. This is performed based on the concept that a small difference exists between varying header field values. The 'compressed TCP nondelta,' on the other hand, is a method of transmitting a varying header field as it is.

Figure 4:
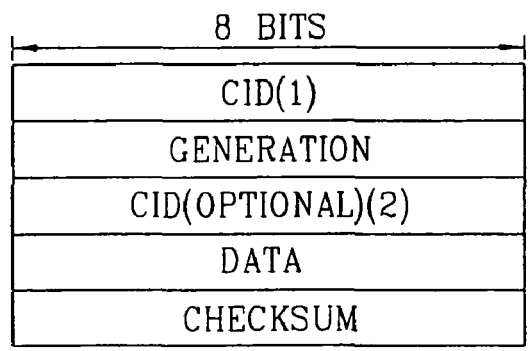
FIG. 4 is a diagram illustrating a structure of a compressed header used in a UDP/IP protocol.
Figure 5:
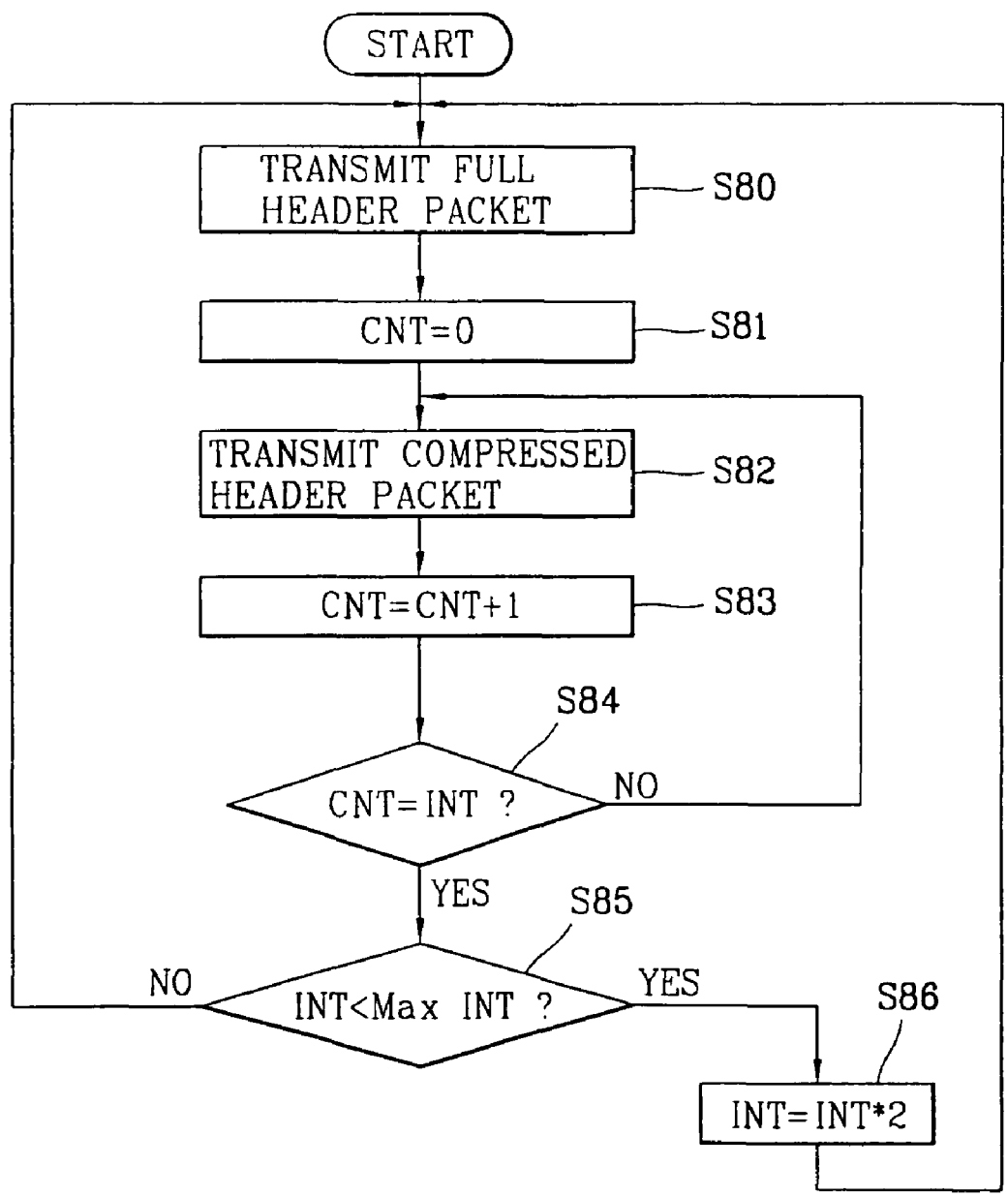
FIG. 5 is a flow chart of a method for transmitting full-header and compressed header packets by the CSS method of the related art.

In order for a receiving party to recover a compressed header, a reference value is necessary. Thus, header compression may be performed by first transmitting a full-header containing every field of a non-compressed header. The portion which is not changed in a specific packet stream of the full-header, such as shown by the shaded portions in FIG. 4, is used to recover a compressed header to be transmitted thereafter. The information required for recovering the compressed header is defined a context of a corresponding packet stream, and this context serves as reference information in recovering the compressed header to a normal header. A packet containing the full-header required for updating or generating a context may be defined as a full-header packet, and a packet in which header information is compressed and transmitted may be defined as a compressed header packet. When a change in context occurs during packet transmission, the changed full-header should be transmitted before transmission of the compressed header packets. As previously indicated, a full-header packet is much larger than the general compressed header packet, and a packet stream is preferably constructed such that the field is not frequently changed in one packet stream.

A header compression technique used to compress a header using the 'compressed TCP' or the 'compressed TCP nondelta' such as TCP/IP will now be described. Previously, it was discussed that a header technique has been proposed which transmits a full-header packet as a first packet in a data stream. According to this technique, since there can be more than one packet stream in a network, an identifier indicating a context for each packet stream may be used to distinguish these streams. An identifier of this type is referred to as a context identifier (CID). In many, if not all cases, the CID value has a length of 8 bits for a TCP packet, and when the compressed header or the full-header is transmitted the CID value should also be transmitted. The transmitted full-header information is stored in the receiving party according to the CID value, and when the packet arrives the receiving party reads the full-header information based on the CID value to recover original header information.

Figure 10A:
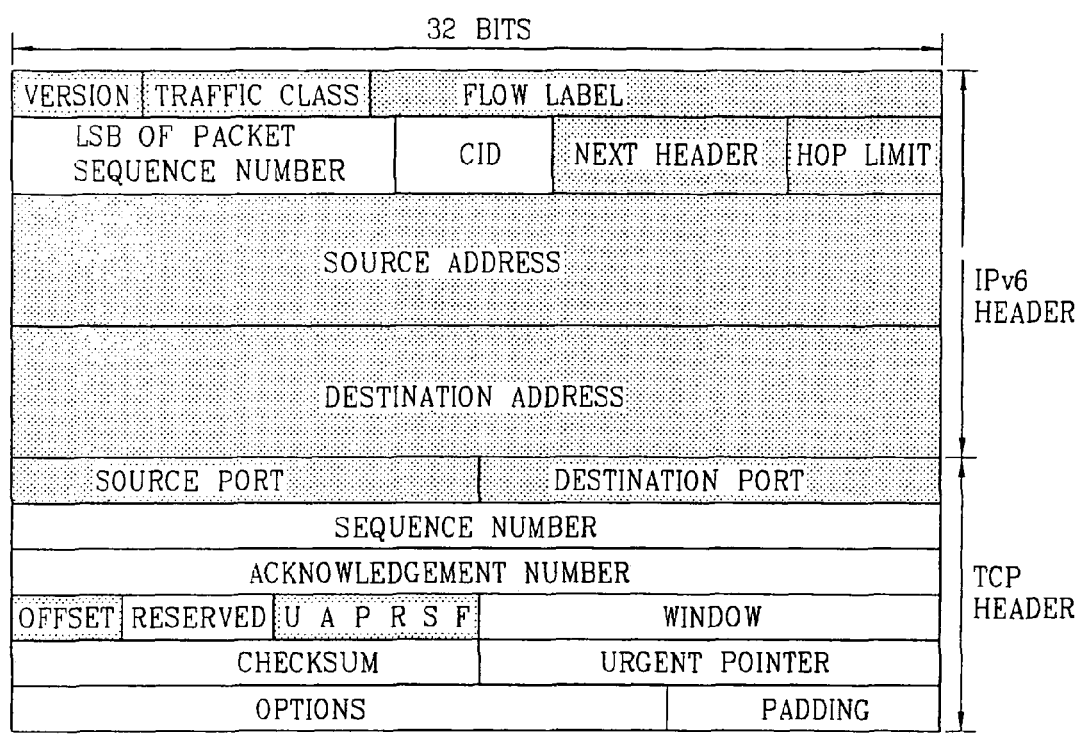
FIG. 10A is a drawing illustrating a structure of a full-header transmitted in using the header compression technique for a TCP/IPv6.

FIG. 10A shows a structure of a full-header transmitted in adopting the header compression technique for the TCP/IPv6. At this time, the full-header is the same for 'Compressed TCP' and 'Compressed TCP nondelta'. As the original TCP/IPv6 header field does not include a CID field, it is not possible to insert the CID value. Thus, a suitable field should be found into which the CID value may be inserted. Since information of the existing 'payload length' field is information that can be known from a lower layer, the corresponding field is not necessarily used. Therefore, the CID may be inserted into the 'payload length' field and transmitted.

FIGS. 10B and 10C illustrates the compressed TCP format and the compressed TCP nondelta format, respectively, in accordance with a preferred embodiment of the present invention. A compressed header formed by the compressed TCP technique and transmitted using TCP/IPv6 is constructed in accordance with the non-shaded portions of the header of FIG. 10A. At this time, of the fields of the compressed header, a CID field has a fixed value, a checksum field has a variable value, and remaining fields have a difference value from the previous compressed header. The size of the compressed header is usually 4-7 octets.

When the Compressed TCP nondelta technique is used for TCP/IPv6, the compressed header is constructed in accordance with the non-shaded portions of the header of FIG. 10A, which is just the same as the compressed TCP technique. At this time, of the fields of the compressed header, a CID field has a fixed value and the remaining fields have variable values. Since all the fields other than the CID field have variable values and the variable values usually take more bits than the difference values, the size of a Compressed TCP nondelta header is larger than that of a Compressed TCP header. The size of the compressed header is usually 17 octets.

A protocol which does not use TCP, such as the UDP/IP protocol, compresses a header using a 'Compressed Non-TCP' method similar to the case of TCP/IP. Like TCP/IP, in order to use a header compression technique for a specific packet stream, a process of transmitting a full-header packet as a first packet is necessary and including a CID for identifying each packet stream is also necessary. The CID value, which usually has an 8-bit length or a 16-bit length, should be transmitted together with a compressed header or the full-header.

In a UDP/IP header compression technique, in addition to a CID value, a generation field indicating generation of header information is additionally used. The generation field indicates how old header information of a packet is and it is always transmitted together with the CID value.

Figure 11:
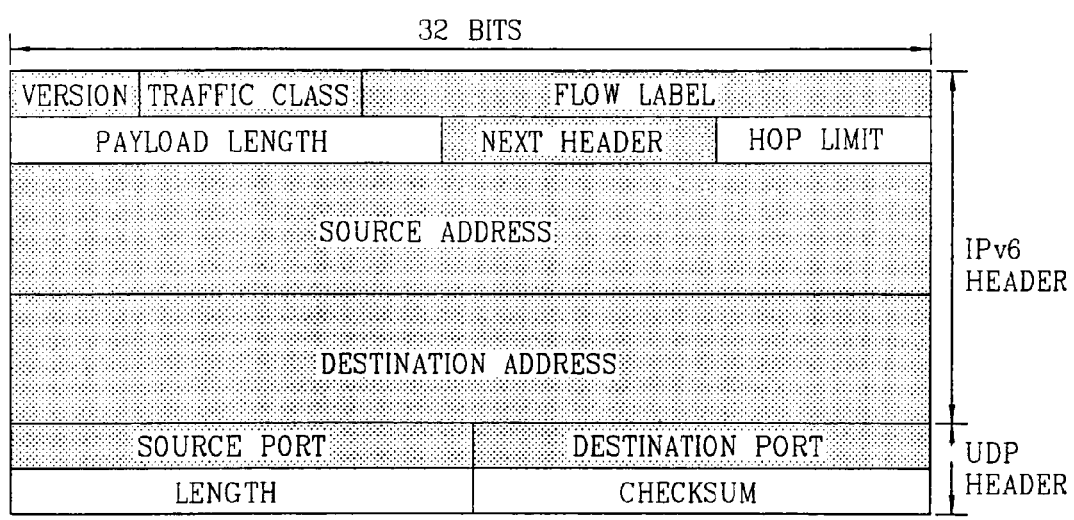
FIG. 11 is a drawing illustrating a structure of a normal header transmitted for a UDP/IPv6.
Figures 12A, 12B, 12C:
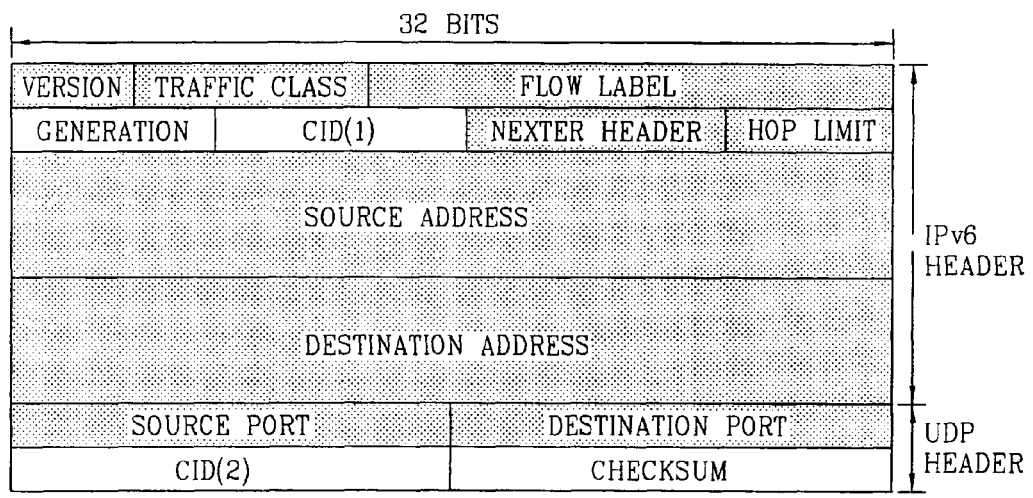
FIG. 12A is a drawing illustrating a structure of a full-header transmitted in using the header compression technique for a UDP/IPv6.
FIGS. 12B and 12C illustrate a compressed non-TCP format of 8 bit CID and a compressed non-TCP format of 16 bit CID, respectively.

FIG. 12A shows a structure of a full-header transmitted in accordance with a header compression technique used for a UDP/IPv6 packet. As shown, since the normal UDP/IPv6 header field (FIG. 11) does not have a CID field or a generation field, the CID and the generation values are inserted into the existing 'payload length' field or 'length' field and then transmitted. In the case where an 8-bit CID value is used, only CID(1) may be used. In the case where a 16-bit CID value is used, only CID(2) may be used and a portion of the payload length field is used for the generation value.

FIGS. 12B and 12C illustrate a compressed non-TCP format of 8 bit CID and a compressed non-TCP format of 16 bit CID, respectively, in accordance with a preferred embodiment of the present invention. The compressed header transmitted using the header compression technique for UDP/IPv6 is constructed in accordance with the non-shaded portions of the header shown in FIG. 12A. The size of this header is usually 4-5 octets. At this time, of the fields of the compressed header, the CID field and the generation field have a fixed value while the checksum field has a variable value. The present invention is a system and method for controlling the transmission of packets in a communications system in a manner which is faster and more efficient than other proposed systems. The invention achieves this improved performance by employing a packet header compression scheme which determines the transmission of a packet with one of full-header or compressed header according to the report of a lower layer, preferably, without any request from the receiver. Preferably, the determination is done in PDCP layer, and the lower layer is RLC layer. This ensures that the attachment of a full-header to a packet is triggered by the RLC report of transmission failure of prior packet in addition to the conventional method, and one of the trigger of attachment of a full-header to a packet according to the conventional method such as CSS method is excluded by the RLC report of transmission success of prior full-header packet, thereby improving transmission efficiency and data rates.

In accordance with one embodiment, the invention permits transmitting a full-header packet even if the receiver did not request. Conventionally, the full-header packet is preferably the first packet transmitted in the stream, but if desired the full-header packet may be transmitted after the first packet. The remaining packets in the stream are preferably compressed header packets. The invention permits transmitting a full-header packet after the first full-header packet. At the receiver, the compressed headers are transformed into full-headers based on the full-header information in the newly transmitted full-header packet, though the receiver failed to establish the context of header information of a packet stream with the first full-header packet.

In accordance with another embodiment, the invention achieves the improved performance by employing a packet compression scheme which minimizes the number of packets transmitted with full-header information in any given data stream. This ensures that almost all packets in the stream are transmitted with compressed header information, thereby improving transmission efficiency and data rates. In accordance with the embodiment, the invention permits transmitting an entire data stream with only one full-header packet and the remaining packets in the stream are transmitted with compressed headers. At the receiver, the compressed packets are transformed into full-header packets based on information in the single full-header packet.

While the invention may be applied to a variety of communications systems including both wired and wireless systems, the invention is ideally suited for use in a mobile radio communication system such as UMTS system which transmits packets according to a protocol which includes a header compression layer and a data link layer. In operation, the header compression layer generates and sends compressed- and full-header packets to the data link layer for transmission. In the preferred embodiments, one of the novel features is to determine one of full-header or compressed header according to the report of a lower layer, and preferably, regardless of any request from the receiver. The determination is done in PDCP, and the lower layer is the RLC of the transmitter.

Referring to the first embodiment, the header compression layer controls which packets to compress based on feedback information from the data link layer which indicates whether a previously transmitted full-header packet has been discarded (it means that the transmission was failed). If so, the next packet in the stream may be transmitted as full-header packets. If not, the receiver may fail to establish the context of header information of a packet stream with the first full-header packet or the successive packet with compressed header and may not recover the header information by the compressed-header packet. Even though the receiver might establish the context of header information of a packet stream with the first full-header packet, the header compression layer of the transmitter sends a full-header packet whenever the lower layer reports that it discarded a packet. Through this feedback information of the lower layer, the invention is therefore able to minimize the number of request of full-header packets from the receiver.

Figure 13A:
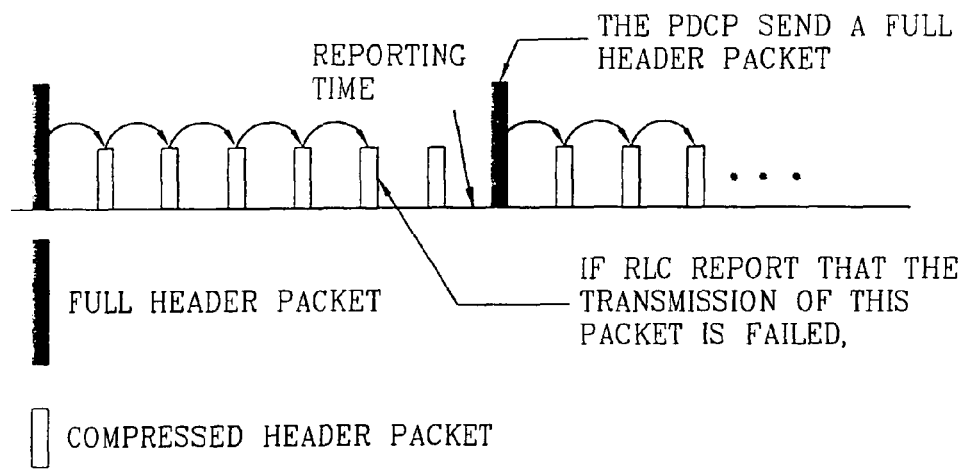
FIG. 13A graphically illustrates a feature of the preferred embodiment relative to the compressed and full header packet transmission for TCP transmission.

In other words, in compressed TCP (including compressed TCP nondelta), even if the receiver (it means the PDCP of the receiver) did not request the transmission of full-header packet, if any RLC SDU (same as the PDCP PDU) is discarded (it means that the transmission was failed), the PDCP sends a full-header packet next time. FIG. 13A graphically illustrates this feature of the preferred embodiment relative to the compressed and full header packet transmission. As shown therein, if the RLC layer (e.g., of the transmitter) reports that the transmission of a packet has failed, the PDCP layer (e.g., of the transmitter) sends a full header packet after a prescribed reporting time.

Referring to the second embodiment, the header compression layer controls which packets to compress based on feedback information from the data link layer which indicates whether a previously transmitted full-header packet has been successfully received. If so, the remaining packets in the stream may be transmitted as compressed-header packets. If not, one or more full-header packets are intermittently transmitted until one is successfully received. The remaining packets are then transmitted as compressed-header packets. Through this feedback information of the lower layer, the invention is therefore able to minimize the number of full-header packets transmitted in any given data stream.

In other words, in compressed non-TCP (Compression Slow Start), even if the receiver (it means the PDCP of the receiver) did not request the transmission of compressed-header packet instead of transmitting full-header packet, if the RLC SDU (same as the PDCP PDU) is removed from RLC buffer without any discard (it means that the transmission was successful), the PDCP sends compressed header packets next time. Thereafter, even if the receiver (it means the PDCP of the receiver) did not request the transmission of full-header packet, if any RLC SDU (same as the PDCP PDU) is discarded (it means that the transmission was failed), the PDCP sends a full-header packet next time.

Figure 13B:
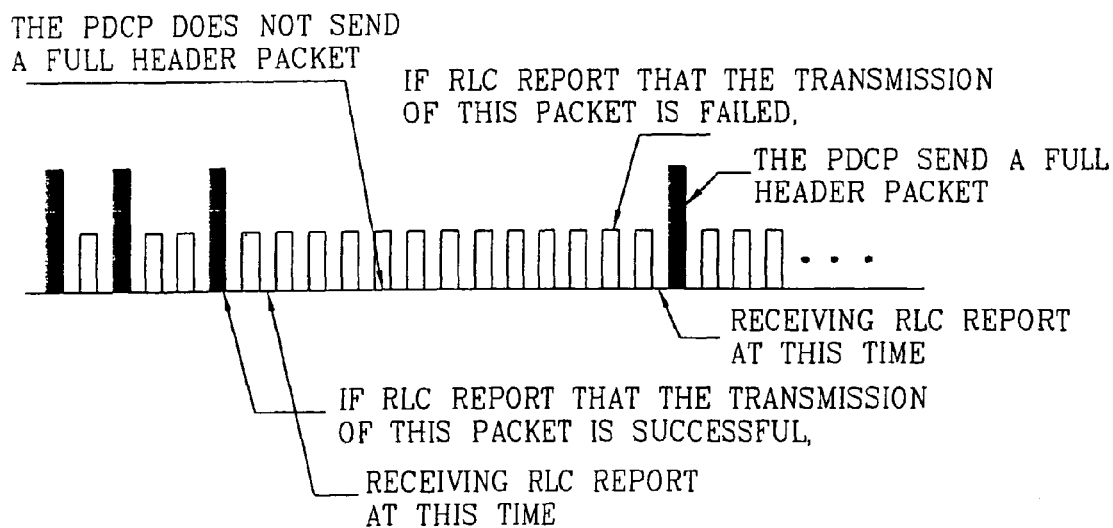
FIG. 13B graphically illustrates this feature of the preferred embodiment relative to the compressed and full header packet transmission for non-TCP transmission.

FIG. 13B graphically illustrates this feature of the preferred embodiment relative to the compressed and full header packet transmission for compressed non-TCP for CSS. As shown therein, if the RLC layer (in this case, of the transmitter) reports that the transmission of the full header packet is successful, the PDCP layer (in this case, of the transmitter) does not send a full header packet at the prescribed intervals of 1, 2, 4, 8, etc, after receiving the RLC report. However, if the RLC layer reports that the transmission of a prescribed compressed packet has failed, the PDCP sends a full header packet after receiving the RLC report.

Figure 13C:
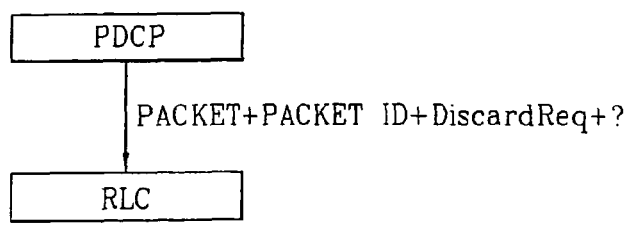
FIG. 13C illustrates the parameters delivered between the PDCP and the RLC for implementing the reporting instruction.

FIG. 13C illustrates the parameters delivered between the PDCP and the RLC for implementing the reporting instruction. As shown therein, the PDCP delivers to the RLC the packet, the packet identifier and parameter DiscardReq which indicates whether the transmitting RLC entity needs to inform the upper layers of the discarded RLC SDU. If required, the transmitting RLC entity notifies upper layers when the SDU is discarded. In AM operation only, a parameter Status indicates whether an RLC SDU is successfully transmitted or discarded.

The present invention is especially well suited for use in the packet-switching domain proposed by the TSG-RAN and TSG-CN. Detailed embodiments of the invention will now be discussed.

Figure 1:
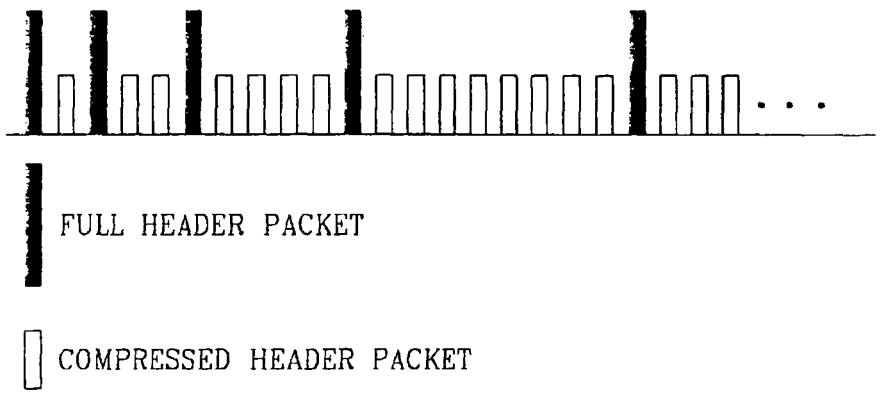
FIG. 1 is a diagram illustrating transmission intervals used to transmit full-header information in accordance with a CSS method of the related art.
Figure 2:
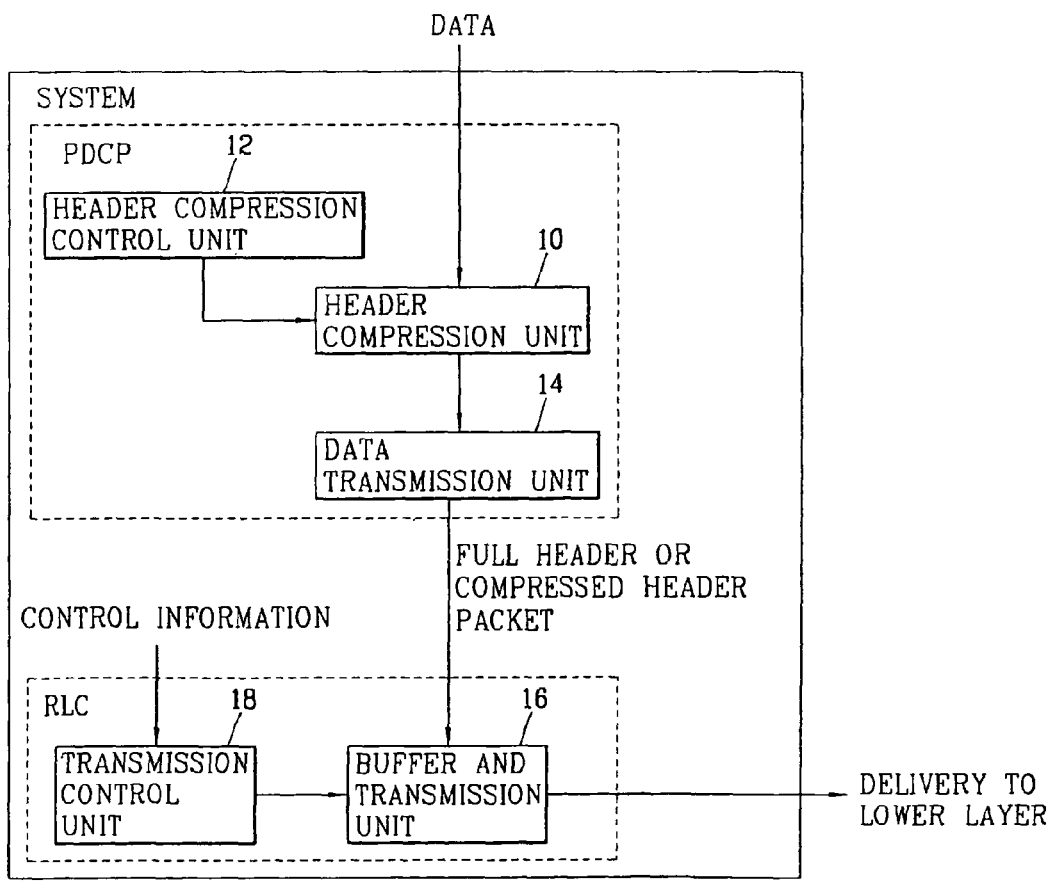
FIG. 2 is a block diagram of a packet transmission system using a header compression technique in accordance with a related art.
Figure 3:
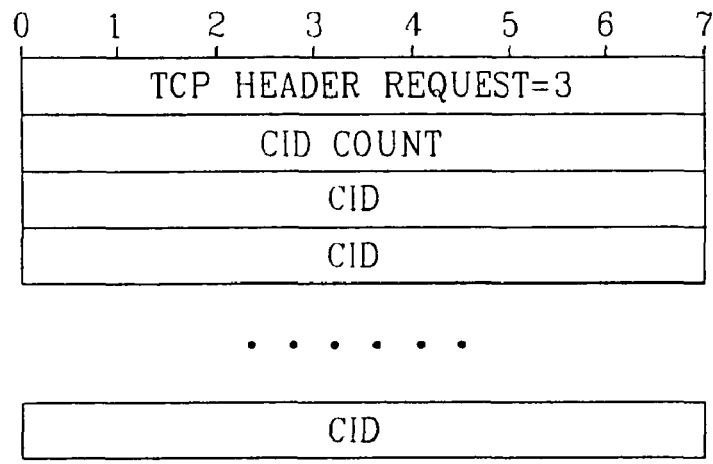
FIG. 3 is a drawing illustrating a structure of a context state packet used for recovering a context for packets transmitted in a communications system.
Figure 14:
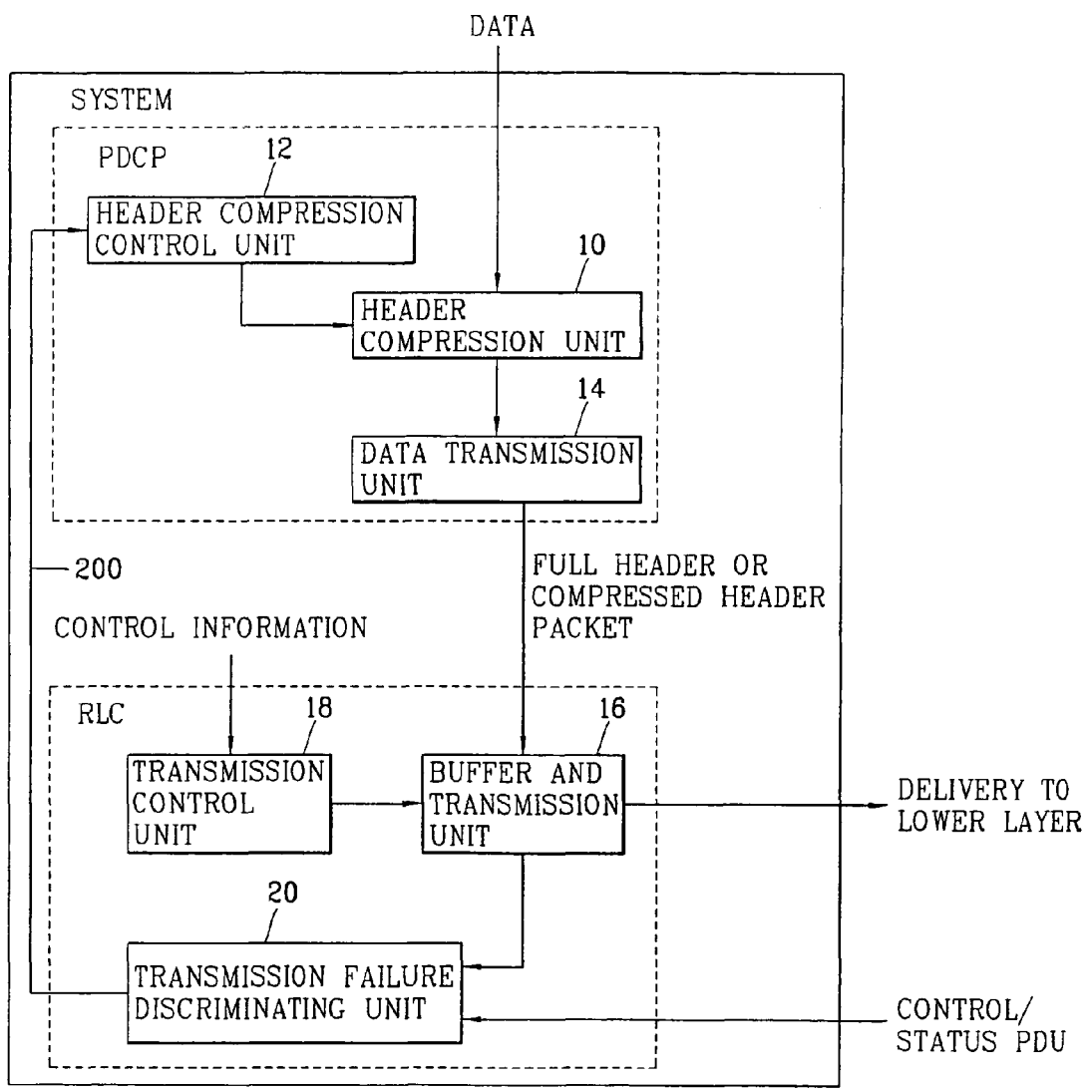
FIG. 14 is a block diagram of a packet transmission system using a header compression technique in accordance with one embodiment of the present invention.

FIG. 14 is a block diagram of a packet transmission system in accordance with one embodiment of the present invention includes a PDCP portion and an RLC portion. The RLC portion includes a transmission failure discriminating unit 20, transmitting unit 16, and transmission control unit 18. The transmission failure discriminating unit is preferably provided in the RLC layer and performs two functions. The first function is discriminating a transmission-failed packet data among packet data transmitted through the buffer. The second function is sending feedback information to a header composition control unit 12 along a feedback path 200. The transmission failure discriminating unit also sends information to an open protocol layer indicating that a transmission failure of packet data has occurred. Remaining elements in the system may be similar to those in the related art packet transmission system illustrated in FIG. 2.

Operation of the packet transmission system in accordance with the present invention will now be described. Initially, data transformed into a full-header packet or a compressed header packet in a header compressing unit 10 of the PDCP layer is delivered to the RLC layer through a data transmission unit 14. The RLC layer stores the received packet data in a buffer 16 and/or transmits it to a receiving party through a transmitting unit 16 based on control information from a transmission control unit 18.

At this time, the transmission failure discriminating unit 20 discriminates whether transmission of a packet from the RLC layer to the receiving party has failed and delivers transmission failure information to a header compression control unit 12 in the PDCP layer along path 200. The transmission failure information preferably includes ID information of a corresponding packet and/or a transmission failure indicator.

The PDCP layer controls header compression unit 10 based on the transmission failure information delivered from the RLC layer. Specifically, if the header compression control unit in the PDCP layer receives a transmission failure indicator from unit 20 indicating that a transmission failure has occurred from the RLC layer, control unit 12 controls the header compressing unit 10 to compress a following packet (and preferably the first packet to follow) using the same CID as a CID of the transmission-failed packet as a full-header packet and delivers it to the RLC layer. This aspect of the invention may be modified in a number of ways.

In the case of using a header compression technique which updates a context by only using a full-header packet, when the full-header packet, among packets delivered from the PDCP layer to the RLC layer, is not successfully transmitted to the receiving party, the RLC layer provides ID information and transmission failure information of the corresponding packet to the PDCP layer.

In a system which transmits packet data using the compressed TCP compression technique, if a context of the receiving party is damaged due to a packet-transmission failure, the header compression layer (PDCP layer) of the transmitting party transmits a new full-header packet of the corresponding context to the receiving party immediately when it receives the transmission failure information on the corresponding packet from the lower data link (RLC) layer. Accordingly, the receiving party can prevent additional loss of packets and recover the context quickly.

In a case of using the compressed non-TCP compression technique, in accordance with the present invention the transmission result on an RLC SDU transmitted from the RLC layer is delivered to the PDCP layer, so that the PDCP layer can effectively control, periodically or non-periodically, repeated transmission of the full-header packet. For this purpose, the RLC layer performs the additional function of informing a transmission result of the PDCP PDU (e.g., RLC SDU), coming down from the PDCP layer.

Operation of the RLC layer will now be described. The RLC layer, which transmits RLC SDUs (=PDCP PDUs) delivered from the PDCP layer, is operated in one of three modes: a transparent mode, an unacknowledged mode, and an acknowledged mode.

When operated in transparent mode, the RLC layer transmits an RLC SDU from the PDCP layer as is, i.e., without adding header information to it. Whether or not a segmentation function should be used can be determined according to the set-up of a radio bearer, but even in the case where an RLC SDU is segmented no header information is added.

When operated in unacknowledged mode, the RLC layer constructs the RLC PDU using a segmentation and concatenation function for the RLC SDU, adds header information thereto, and transmits it to the receiving party.

When the RLC layer is operated in transparent mode and unacknowledged mode, only uni-directional communication is possible. The receiving party does not transmit any information regarding receipt of the RLC PDU to the transmitting party (RLC layer).

When operated in acknowledged mode, the RLC layer segments or concatenates RLC SDUs to form PDUs of a pre-defined size, adds RLC header information containing a sequence number, and stores the result in the RLC buffer. In acknowledged mode, bi-directional communication between RLCs is possible. As a result, re-transmission of a packet lost during transmission may be performed.

Also, in acknowledged mode, the RLC of the transmitting party transmits RLC PDUs in an order determined by transmission sequence numbers. The RLC layer of the receiving party recognizes which RLC PDUs have not been successfully transmitted by observing the sequence numbers of the RLC PDUs which are successfully received. The receiving party may then generate a status PDU indicating which PDUs were and were not successfully transmitted. PDUs which were not successfully received may be designated with negative acknowledgment information. Once formed, the status PDU is transmitted to the transmitting party, and upon receiving the status PDU the transmitting party may re-transmit the unsuccessfully transmitted RLC PDUs, i.e., the ones designated with a negative acknowledgment.

In accordance with the present invention, the RLC layer of the transmitting party recognizes a transmission result of a specific RLC PDU based on the acknowledgment/non-acknowledgment information included in the status PDUs transmitted from the RLC layer of the receiving party. In addition, since the RLC layer of the transmitting party can recognize a corresponding relationship between an RLC PDU and an RLC SDU, the RLC layer of the present invention can easily recognize a transmission result for a specific RLC SDU.

Thus, when the RLC layer is operated in acknowledged mode, the RLC layer may inform the PDCP layer of a transmission result of a specific RLC SDU, and the PDCP layer will as a result detect the transmission result of the full-header packet, thereby ensuring that the full-header is more effectively transmitted compared with related art methods.

For this purpose, in accordance with the present invention when a transmission result of a specific RLC SDU is confirmed by the RLC layer of the transmitting party, the RLC layer of the transmitting party informs the PDCP layer of the transmitting party of the identification number and transmission result of the corresponding RLC SDU. The transmission result may be transmission success information or transmission failure information. Transmission success information is sent to the PDCP layer when the RLC layer is informed, for example, based on a received status PDU that a specific RLC SDU was successfully transmitted. Transmission failure information is sent to the PDCP layer, for example, based on a received status PDU indicating that a specific SDU was not successfully transmitted and/or when the RLC layer discards one or more RLC SDUs that are not transmitted for a long time.

The RRC layer, which is an upper layer relative to the PDCP layer which handles header compression, sets a radio bearer so that the RLC layer provides the PDCP layer with information on the RLC SDU discarded from the RLC. When the PDCP layer delivers a PDCP PDU to the RLC layer, it instructs the RLC layer to inform the PDCP layer about the transmission failure result with respect to the corresponding PDCP PDU. For this purpose, when the PDCP layer delivers the PDCP PDU to the RLC layer, the RLC layer vis-a-vis transmission control unit 18 delivers a transmission result report indicator with the corresponding PDU, so that the RLC layer provides the PDCP layer with the information regarding discarding of the corresponding SDU in its occurrence.

In the PDCP layer, the transmission result of a full-header packet may be considered more important than the transmission result of a compressed header packet. Thus, even though the RLC layer informs the PDCP layer of only the periodically or non-periodically repeated transmission result of the full-header packet, rather than informing the PDCP layer of the transmission result of every packet, the present invention advantageously achieves the same effect as if it informed the PDCP layer of the transmission result of every packet.

In such a case, when the PDCP layer delivers the PDCP PDU containing the full-header packet to the RLC layer, the PDCP layer delivers the full-header indicator together with the corresponding RLC SDU (=PDCP PDU), and the RLC layer informs the PDCP layer of the transmission result of the corresponding RLC SDU.

Since the PDCP layer of the transmitting party detects the periodically and non-periodically repeated transmission result of the full-header packet from the RLC layer, the lower layer, it can perform diverse operations using this information to heighten transmission efficiency of the packet.

If the full-header packet is successfully transmitted, the PDCP layer of the receiving party would have available to it accurate full-header information. Under these circumstances, it is therefore unnecessary to transmit the full-header for a corresponding packet stream any more, e.g., only one full-header packet is transmitted for all packets in a given data packet stream if that one packet is successfully received and the transmitting party RLC is informed of the same. Consequently, in the system in which the full-header packet for a specific packet stream is repeatedly transmitted periodically or non-periodically, if full-header information is successfully transmitted once, the full-header packet is not transmitted any more and the remaining packets in the stream may therefore be transmitted in the form of only compressed header packets.

If the periodically or non-periodically repeated transmission of a full-header packet has failed and every full-header packet which has been previously transmitted also failed in its transmission, the PDCP layer of the transmitting party may transmit a full-header packet for the same packet stream once again. More specifically, in the case where a full-header packet is repeatedly transmitted either periodically or non-periodically, if transmission of a full-header packet failed and no full-header packet has yet to be successfully transmitted, a full-header packet for the same packet stream may immediately be transmitted, rather than conforming to a pre-set transmission period of the full-header packet. Alternatively, transmission of the full-header packet may be performed according to a pre-set period or the CSS technique can be re-started.

When a message indicating that at least one full-header packet has been successfully transmitted is received from the RLC lower layer, while the PDCP layer of the transmitting party is transmitting the full-header packet and the compressed header packets, the full-header packet for the corresponding packet stream is not transmitted any more and only the compressed header packet is transmitted thereafter.

The PDCP layer of the transmitting party preferably checks whether the full-header packet has been successfully transmitted when it reaches a time to transmit the full-header while the data is being transmitted periodically or non-periodically by the CSS technique. Upon checking, if at least one full-header packet has been successfully transmitted, the PDCP layer of the transmitting party does not transmit another full-header packet for the corresponding packet stream. Instead, upon receiving confirmation that the full-header packet has been successfully transmitted from the RLC layer of the transmitting party, the PDCP layer transmits the remaining packets in the stream as compressed header packets without using a counter such as the CNT or the INT.

The method of the present invention for transmitting packets in a communications system will now be discussed. In accordance with the present invention, compressed-header packets that are transmitted by this method may include any one of compressed TCP header information, compressed TCP nondelta header information, and compressed non-TCP header information. Preferably, the compressed-header packets correspond to RFC 2507 header-compression packet types, i.e., ones which conform to an RFC 2507 header compression protocol. Those skilled in the art can appreciate, however, that the packet data transmitted by the present invention may be generated using other header compression protocols if desired.

Figure 15:
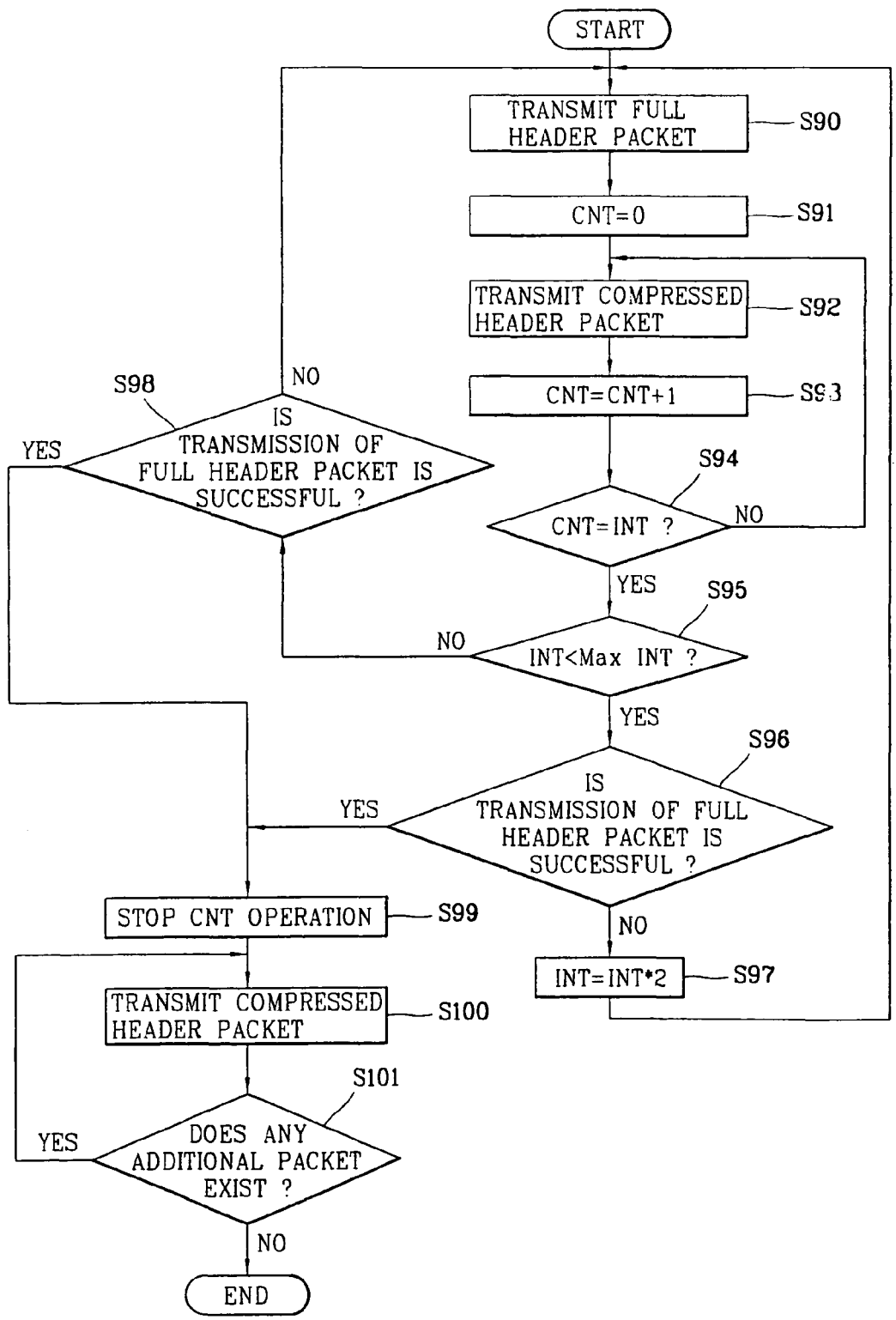
FIG. 15 is a flow chart showing steps included in a method for transmitting full-header and compression header packets by a CSS in accordance with one embodiment of the present invention.

FIG. 15 is a flow chart showing steps included in one embodiment of a method of transmitting packets containing full and compressed headers in accordance with the present invention. At this time, it is noted that the INT value may be set to a value of '1' at an initial stage.

When packet transmission is initiated, the method begins by having the RLC layer transmit a full-header packet to the receiver (S90). The parameter CNT, indicating a running count of the number of transmitted compressed header packets is then initialized to a value of '0' (CNT='0' (S91). The RLC layer then transmits a compressed header packet (S92) and the CNT value is increased by '1' (CNT=CNT+1) (S93).

In a next step, the RLC layer checks whether the INT value and the CNT value are the same (S94). If the two values are different, steps S92-S94 are repeatedly performed. If the two values are the same, the RLC layer checks whether the INT value is greater than MaxINT, which preferably corresponds to a predetermined threshold value defining a maximum number of compressed header packets to be transmitted before a next full-header packet is to be considered for transmission.

If the INT value is smaller than MaxINT, the RLC layer determines whether the full-header packet has been successfully transmitted (S96). This determination may be made, for example, based on information contained in a status PDU transmitted from the receiver. If the full-header packet is determined to have been successfully transmitted, the RLC layer stops a counting operation of the compression header packets (S99) and all remaining packets in the data stream are transmitted as compressed header packets (S100 and S101).

If transmission of the full-header packet is determined to have been unsuccessful in step S96, the RLC layer continuously performs steps S90-S97 while increasing the INT value by an exponential multiple of '2' (e.g., 1, 2, 4, 8, 16, . . . , 256). (See step S97). During these iterations, even if the INT value becomes greater than the MaxINT value in step S95, it is determined whether transmission of the full-header packet has been successful (S98). If transmission of the full-header packet was not successful, the operation after the step S90 of transmitting the full-header packet is performed. If however, the transmission of the full-header packet has been successful, steps S99-S101 are performed, i.e., all remaining packets in the data stream are transmitted as compressed header packets.

It is noted that embodiments of the present invention have been adopted in 3GPP Technical Specifications TS 25.322v4.2.0, entitled 'RLC Protocol Specification,' and TS 25.323v4.2.0, entitled 'MCP Protocol Specification,' TS 25.323v4.3.0, TS 25.323v4.5.0 and TS 25.323V5.1.0, including all additions and modifications thereto, the contents of which are incorporated by reference herein. These features of the invention may be expressed as follows:

Management of Full-Header Transmission

Transmission of a full-header packet may be controlled by lower layer information.

For a TCP stream, if the PDCP receives from the lower layer the information of a failed transmission of a single packet, the PDCP may send the next packet as a full-header.

For a non-TCP stream, if the PDCP receives from the lower layer information of successful transmission of a full-header packet, the PDCP may stop sending the full-header packet that contains the same full-header as a previously transmitted one.

The packet data compressing and transmitting method of the present invention has at least the following additional advantages. In a system which transmits packets using the Compressed TCP compression technique, if a context of the receiving party is damaged due to a transmission failure of an arbitrary packet, a new full-header packet of the corresponding context is transmitted to the receiving party immediately when the header compression layer (the PDCP layer) of the transmitting party receives transmission failure information on the corresponding packet from the lower data link layer. Thus, additional packet loss can be prevented and the context can be quickly recovered.

This approach may be restated in the following manner. In RFC 2507, the decompressor can use the Header Requests technique to recover the corrupted context. But it takes a long time to recover the context; the decompressor detects and invalid context, waits until several invalid contexts are detected, then constructs a CONTEXT-_STATE packet including their CID values, and sends it to the compressor. Based on the received CONTEXT_STATE packet, the compressor knows which contexts are corrupted, and transmits a full-header packet for each corrupted CID value. During the context recovery, all the compressed packets of the CID values will be discarded at the decompressor. Quick recovery of corrupted context is very important for improving throughput. If one considers RLC characteristics, one can recover context much faster than Header Request techniques. According to the present invention, when an RLC SDU is discarded, the RLC Tx indicates the SDU discard information to upper layer (PDCP). Using this information, the PDCP can know which context is corrupted (i.e., which RLC SDU is discarded), and transmits a next packet of the throughput can be greatly improved. The corrupted context is quickly detected, and, by sending a full-header packet immediately, further loss of packets (due to the failed decompression) is prevented. To summarize, simple indication of discarded SDU can greatly improve the throughput.

In the system which transmits a packet by using the compressed non-TCP compression technique, when the full-header packet is transmitted according to a rule, if the full-header packet is successfully transmitted for one data stream, the full-header packet is not transmitted any more and only the compressed header packet is transmitted. Thus, a transmission efficiency of the packet can be heightened.

This approach may be restated in the following manner. When the context is corrupted by discard of a full-header packet that has changed the context, Compression Slow-Start and Periodic Header Refreshes techniques may be used to recover the corrupts context. These techniques send the 'same' full-headers periodically to ensure that a full-header is successfully received by the Receiver. It means even though a full-header is sent successfully, the same full-headers (e.g., 32-48 octets) are still sent periodically.

These techniques are good for simplex link because the compressor does not know whether a full-header transmission was successful or not. Therefore, they are also good for TM and UM RLC. But if one uses AM RLC, one can further improve the efficiency by not sending a successfully transmitted full-header. In AM RLC, there are status reports from the Receiver, which inform the Sender of successful or failed transmission of each RLC SDU (More specifically, the status of each RLC PDU). If an RLC SDU is successfully transmitted, the Sender reports this to upper layer by MUI (Message Unit Identifier). According to the present invention, when a full-header packet is successfully transmitted, stop the Compression Slow-Start and Periodic Header Refresh techniques at the compressor. Sending the same full-header that was already successfully transmitted is just wasting radio resource, and it should be avoided to improve the throughput.

The present invention is able to substantially improve transmission efficiency through this header compression technique. It is further noted that the present invention is not limited to a UMTS system but rather can be applied to any type of packet data communication system.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method of transmitting a data packet within a telecommunication system that transmits or receives telecommunication data, wherein the system includes a header compression layer at a transmitting side capable of transmitting a full header packet having all header information and compressed header packets having compressed header information, with respect to a packet stream, the method comprising:

transmitting at least one full header data packet to a receiver side from the transmitter side;

receiving, at a lower layer associated with the transmitter side, an acknowledgement from the receiver side that a data packet containing a full header has been successfully received;

determining, at an upper layer associated with the transmitter side, whether to send a data packet containing a compressed header to the receiver side, based on transferring an indication of the acknowledgement received from the lower layer of the transmitter side at the upper layer of the transmitter side; and in response to said determining based on said indication of acknowledgement, transmitting a data packet containing a compressed header to the receiver side from the transmitter side, wherein the indication of a successful transmission comprises an identifier used to indicate at least one packet that was successfully received by a lower layer of a receiving side.

2. The method of claim 1, wherein the indication from the lower layer relates to a transmission result of one or more packets.

3. The method of claim 1, wherein the indication from the lower layer relates to a periodically or non-periodically repeated transmission result of the full header packet.

4. The method of claim 1, wherein a context identifier is also transmitted with the full header packet to allow each packet stream to be identified.

5. The method of claim 1, wherein the upper layer is a packet data convergence protocol entity, and the lower layer is a radio link control entity.

6. The method of claim 1, wherein the transmitter side is a network and the receiver side is a terminal, or the transmitter side is a terminal and the receiver side is a network.

7. The method of claim 1, wherein the packets are a non-transmission control protocol stream.

8. The method of claim 7, wherein the non-transmission control protocol is a user datagram protocol/Internet Protocol.

9. The method of claim 1, wherein the indication of a successful transmission is provided by radio link control acknowledgement signaling.

10. The method of claim 1, wherein the identifier is a Message Unit Identifier, the at least one packet is a radio link control service data unit, and the lower layer is a radio link control entity.

* * * * *